(12) United States Patent
Hino

(10) Patent No.: US 10,558,004 B2
(45) Date of Patent: Feb. 11, 2020

(54) OPTICAL TRANSCEIVER

(71) Applicant: SUMITOMO ELECTRIC DEVICE INNOVATIONS, INC., Yokohama-shi, Kanagawa (JP)

(72) Inventor: Masato Hino, Yokohama (JP)

(73) Assignee: Sumitomo Electric Device Innovations, Inc., Yokohama-shi (JP)

( * ) Notice: Subject to any disclaimer, the term of this patent is extended or adjusted under 35 U.S.C. 154(b) by 0 days.

(21) Appl. No.: 16/277,722

(22) Filed: Feb. 15, 2019

(65) Prior Publication Data
US 2019/0258012 A1 Aug. 22, 2019

(30) Foreign Application Priority Data
Feb. 16, 2018 (JP) .................................. 2018-025801

(51) Int. Cl.
*G02B 6/42* (2006.01)
*H01R 13/627* (2006.01)

(52) U.S. Cl.
CPC ......... *G02B 6/4292* (2013.01); *G02B 6/4246* (2013.01); *G02B 6/4261* (2013.01); *G02B 6/4278* (2013.01); *G02B 6/4284* (2013.01); *H01R 13/6275* (2013.01)

(58) Field of Classification Search
CPC . G02B 6/4261; G02B 6/4284; H01R 13/6275
See application file for complete search history.

(56) References Cited

U.S. PATENT DOCUMENTS

| 8,506,172 B2* | 8/2013 | Meadowcroft | G02B 6/4261 385/147 |
| 10,330,873 B2* | 6/2019 | Chuang | G02B 6/4261 |
| 2012/0237177 A1* | 9/2012 | Minota | G02B 6/4284 385/134 |
| 2012/0251049 A1* | 10/2012 | Meadowcroft | G02B 6/4261 385/53 |
| 2016/0131859 A1* | 5/2016 | Ishii | G02B 6/4246 385/92 |
| 2019/0212509 A1* | 7/2019 | Takeuchi | G02B 6/4261 |

FOREIGN PATENT DOCUMENTS

JP 2006091640 A 4/2006

* cited by examiner

*Primary Examiner* — Sung H Pak
(74) *Attorney, Agent, or Firm* — Baker Botts L.L.P.; Michael A. Sartori

(57) ABSTRACT

An optical transceiver which is inserted and ejected with respect to a cage is disclosed. The optical transceiver comprises a slider, a housing supporting the slider to slid the slider along the first direction, and a latch rotating along a second direction intersecting with the first direction at the center of a shaft. The latch has a first face engaging the cage and a second face locking the slider, and is supported by the housing. The latch controls the rotating by locking the second face to the slider when the slider is in a first position, and uncontrols the rotating when the slider is in a second position farther than the first position ejected a direction. A position of the shaft is the same position as a position of the first face or more than a position ejected in case of locking the second face to the slider.

6 Claims, 19 Drawing Sheets

OPTICAL TRANSCEIVER

CROSS REFERENCE TO RELATED APPLICATIONS

The present application is based upon and claims the benefit of priority of Japanese Patent Application No. 2018-025801, filed on Feb. 16, 2018, the entire contents of which are incorporated herein by reference.

BACKGROUND

The present disclosure relates to an optical transceiver.

Japanese Unexamined Patent Publication No. JP2006-091640A discloses an optical transceiver. FIG. 19A is a side view illustrating a package structure described in JP2006-091640A. The optical transceiver includes: a package body being constituted so as to be freely inserted and ejected with respect to a cage in a host instrument; a fitting member 102 being rotatably supported by the package body; and a controlling member 104 in contact with the fitting member 102 and controlling rotation of the fitting member 102. A rotary shaft 103 of the fitting member 102 extends along a surface 105 of the package body, and extends in a direction vertical to a fitting and pulling in direction A1. The fitting member 102 projects from the surface 105 of the package body and controls the package body from being ejected by fitting a hole 106a of a cage 106. The controlling member 104 is provided so as to be movable outward of the instrument to a position where controlling of the rotation of the fitting member 102 is released. As illustrated in FIG. 19B, when the controlling of the rotation of the fitting member 102 by the controlling member 104 is released and thus the package body moves outward of the instrument, the fitting member 102 is pressed against an edge of the hole 106a of the cage 106 and rotates, so that fitting between the fitting member 102 and the hole 106a is released.

SUMMARY

The present disclosure provides an optical transceiver which is inserted and ejected with respect to a cage in a first direction. The optical transceiver comprises a slider, a housing supporting the slider to slid the slider along the first direction, and a latch rotating along a second direction intersecting in the first direction at the center of a shaft, and has a first face engaging the cage, and has a second face locking the slider. The latch is supported by the housing. The latch controls the rotating by locking the second face to the slider when the slider is in a first position in the first direction, and uncontrols the rotating when the slider is in a second position farther than the first position ejected a direction in the first direction. A position of the shaft is the same position as a position of the first face or more than a position ejected in the first direction in case of locking the second face to the slider.

BRIEF DESCRIPTION OF THE DRAWINGS

The foregoing and other purposes, aspects and advantages will be better understood from the following detailed description of embodiments of the invention with reference to the drawings, in which:

FIG. 7A is a perspective view of the cover viewed obliquely from below, FIG. 7B is a cross-sectional view of the cover extending along a line VII-VII in FIG. 7A, and FIG. 7C is a top view of the cover;

FIG. 8A is a perspective view of the latch viewed obliquely from above, FIG. 8B is a front view of the latch viewed from a front, and FIG. 8C is a side view of the latch viewed from a lateral side (from a right-left in direction A3);

FIG. 9A is a cross section of the latch passing through a rotary shaft and vertical to a trail line of shaft AX, and FIG. 9B is a cross section of the latch passing through the main body and vertical to the trail line of shaft AX;

FIG. 10A illustrates a cross section of the latch passing through the rotary shaft and vertical to the trail line of shaft AX, and FIG. 10B is a cross section of the latch passing through the main body and vertical to the trail line of shaft AX;

FIG. 11A illustrates a cross section of the latch passing through the rotary shaft and the trail line of shaft AX, and FIG. 11B illustrates a cross section of the latch passing through the main and vertical to the trail line of shaft AX;

FIG. 16A is a perspective view of the latch viewed obliquely from the rear, and FIG. 16B is a perspective view of the latch viewed obliquely from the front;

DETAILED DESCRIPTION

Figure 1:
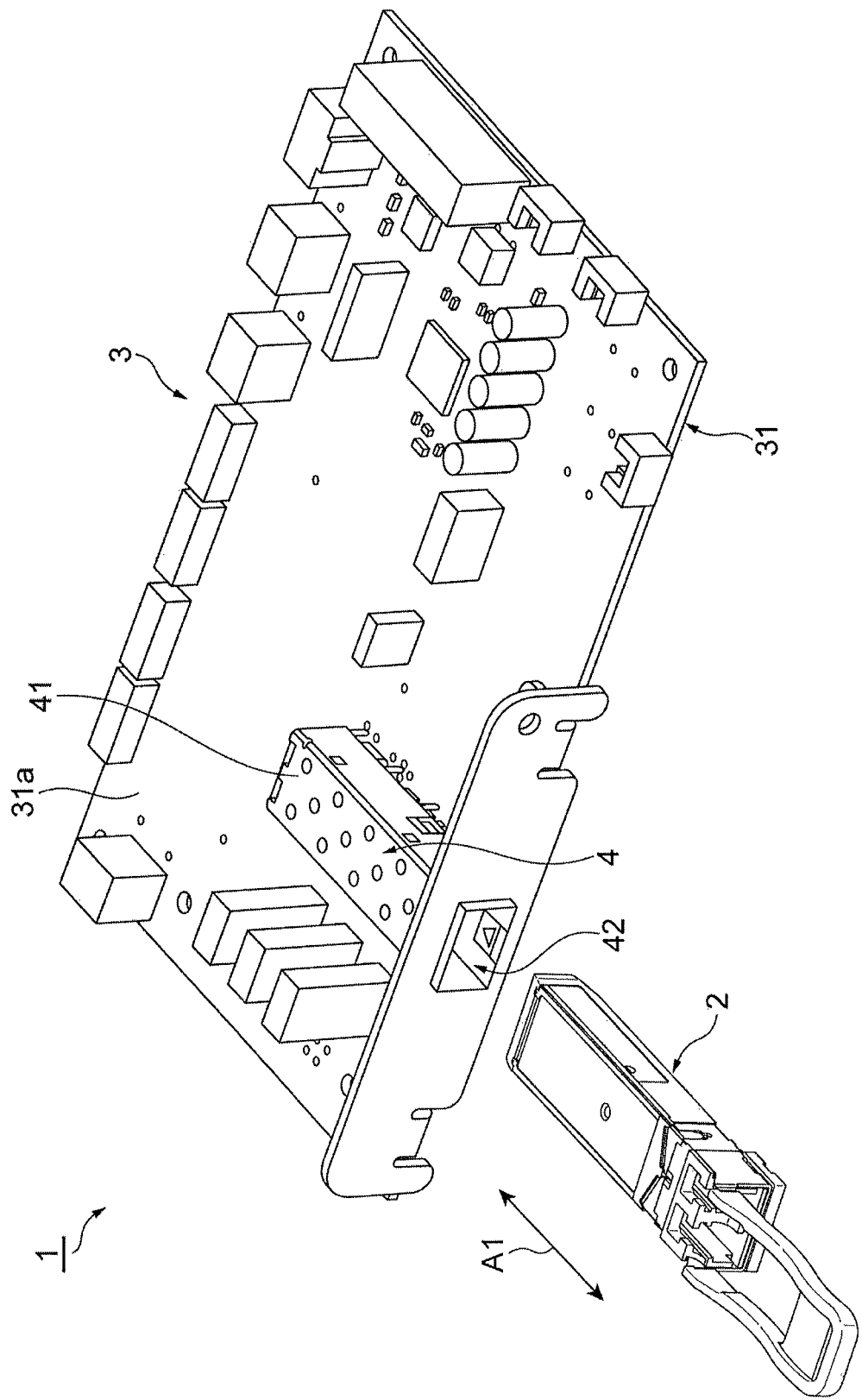
FIG. 1 is a perspective view illustrating a configuration of a structure fitting and pulling according to an embodiment.

Problem to be Solved by the Present Disclosure

An optical transceiver inserted into a cage of a host system is provided with a latch mechanism for preventing the optical transceiver from unintentionally slipping out after an insertion. JP 2006-091640A achieves a latch mechanism by providing a member that is allowed to project outward of a housing (package) on a side surface of the housing, and causing the member and part of a cage to engage. However, in the latch mechanism of JP 2006-091640A, a rotary shaft is provided on the member engaging the cage and the part of the member is caused to project outward of the housing by rotating the member, and a distance between the part of the member and the housing may become longer during the rotation than at the time of engagement, depending on the structures. That is, the part of the member may be significantly apart from the housing during the rotation than at the time of engagement. In this case, the part of the member interferes with parts of the cage other than an engaged part, and thus a smooth operation of the latch mechanism is prevented, so that it may become difficult to disconnect the optical transceiver from the cage. It is an object of the present disclosure to provide an optical transceiver capable of avoiding an interference between the rotating member constituting the latch mechanism and a part of the cage other than the engaged part, and realizing a smooth operation of the latch mechanism.

Advantageous Effect of the Present Disclosure

The optical transceiver of the present disclosure is capable of avoiding an interference between the rotating member constituting the latch mechanism and the part of the cage other than the engaged part, and achieving a smooth operation of the latch mechanism.

Description of Embodiments of Disclosure

Firstly, embodiments of the present disclosure will now be listed up for description. An optical transceiver according to an embodiment is an optical transceiver which is inserted and ejected with respect to a cage in a first direction. The optical transceiver comprises a slider, a housing supporting the slider to slid the slider along the first direction, and a latch rotating along a second direction intersecting in the first direction at the center of a shaft, and has a first face engaging the cage, and has a second face locking the slider. The latch is supported by the housing. The latch controls the rotating by locking the second face to the slider when the slider is in a first position in the first direction, and uncontrols the rotating when the slider is in a second position farther than the first position ejected a direction in the first direction. In the optical transceiver, a position of the shaft is the same position as a position of the first face or more than a position ejected in the first direction in case of locking the second face to the slider.

When the optical transceiver is inserted into the cage of the host system, the first face of the latch engages with part of the cage, whereby the optical transceiver is latched with the cage. At this time, since the slider is in a first position along a fitting and pulling in direction and a second surface of the latch is locked by the slider, the rotating of the latch is restricted, and the optical transceiver is latched stably by the cage. When ejecting the optical transceiver from the cage, a slider firstly moves relatively in the pulling direction with respect to the housing by a force of an operator. Accordingly, the slider moves to the second position in the fitting and pulling in direction, and the locked state of the second surface by the slider is released to bring the latch into a rotatable state. Subsequently, when the latch rotates by receiving a force from the cage, the first face of the latch receives a force from the cage, the engaged state between the first face of the latch and the cage is released.

In the optical transceiver described above, the position of an trail line of shaft in the fitting and pulling in direction (that is, a center of rotating of the latch) is at a position the same as the first face of engagement when the second surface is locked by the slider, or at a position on ejected side with respect to the above-described position. Therefore, the distance between the first face of the latch and the housing is the longest at the time of engagement, and is absolutely shorter than the length at the time of engagement during the rotating. That is, the first face of the latch is significantly away from the housing at the time of engagement than during rotating. Therefore, according to the optical transceiver described above, interference of the first face of engagement of the latch with the part of the cage other than the engaged part is avoided and thus a smooth operation of the latch mechanism is achieved, and the optical transceiver can be removed easily from the cage.

As an embodiment, the latch may have a joint portion jointing the housing, and the latch may rotate either of the first position to the housing when the first face engages the cage and the second position to the housing when the face of the joint portion joints the housing. According to the embodiment, contact between the slider and the second surface of the latch when the slider is moved to the first position again may be ensured by limiting the rotating range of the latch when the slider is in the second position.

As an embodiment, the slider may has a recess part in terminal side inserted to shun intersection in response to the joining portion of the latch in the first position. This embodiment may enhance flexibility of placement of the joint portion on the latch.

As an embodiment, the first face of the latch may extend along the side inserted at engaging the cage by the slider, and the housing may have the shaft, the latch may have a groove extending along by a side of the shaft, the groove may keep the shaft, and at least of an aperture in the groove may be provided in the first face, and a deep in direction of the groove may slope away in response to the first face. According to the embodiment, attachment of the latch with respect to the housing may be facilitated and an unintentional disconnection of the latch from the housing may be suppressed.

As an embodiment, the housing may have the shaft, the latch may have a hole extending along by a side of the shaft, and the shaft of the housing may engage the hole of the latch. According to the embodiment, the rotating action of the latch may easily be realized.

As an embodiment, the second face of latch may touch a bottom face of the slider when the latch is located in the first position, and the second face of latch may release a bottom face of the slider when the latch is located in the second position.

Details of Embodiments of Disclosure

Specific examples of optical transceivers according to embodiments of the present disclosure will be described with reference to the drawings below. The invention is not limited to the illustrations but is defined by claims, and is intended to include any modification within the meaning and scope equivalent to the claims. In the following description, the same components are designated by the same reference numerals and overlapped description will be omitted.

FIG. 1 is a perspective view illustrating a structure fitting and pulling according to an embodiment. As illustrated in FIG. 1, a structure fitting and pulling 1 includes an optical transceiver 2 and a cage 4 provided on a host 3. The host 3 includes a printed circuit board (PCB) 31 and a number of electronic components are mounted on a mounting face 31a of the PCB 31. The cage 4 is also mounted on the mounting face 31a. The cage 4 includes a cage body 41 extending along a fitting and pulling in direction A1. A cross-sectional shape of the cage body 41 vertical to the fitting and pulling in direction A1 is, for example, a rectangular shape. The cage body 41 has a space for storing the optical transceiver 2. The cage body 41 includes an aperture 42 at an end of the space in the fitting and pulling in direction A1. The aperture 42 is located at an edge of the PCB 31, and faces outward of the PCB 31. The cage 4 is, for example, formed of a metal.

Figure 2:
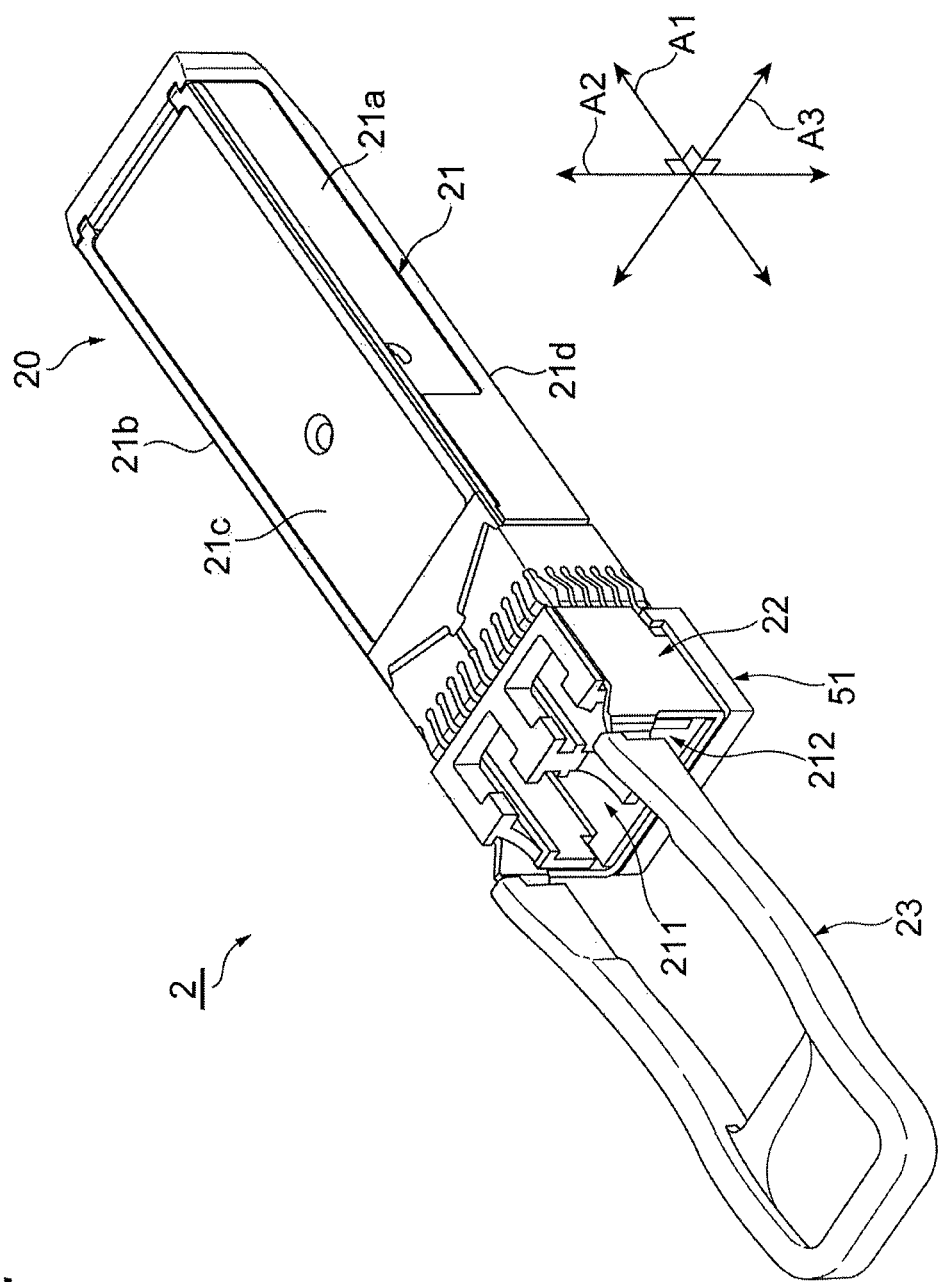
FIG. 2 is a perspective view of an optical transceiver viewed obliquely from above.

The optical transceiver 2 complies with an Small Form-factor pluggable (SFP) standard, and performs a total both-direction optical communication. The optical transceiver 2 is inserted and ejected with respected to (inserted into and ejected from) the cage body 41 of the cage 4 through the aperture 42 along the fitting and pulling in direction A1. FIG. 2 is a perspective view of the optical transceiver 2 viewed obliquely from above. As illustrated in FIG. 2, the optical transceiver 2 includes a housing 20, a slider 22, and a Pull-tab 23. In FIG. 2, in addition to the fitting and pulling in direction A1, an up-down in direction A2 intersecting (for example, orthogonal to) the fitting and pulling in direction A1, and a right-left in direction A3 intersecting (for example, orthogonal to) the fitting and pulling in direction A1 and the up-down in direction A2 are also indicated. In the following explanation, the up-down in direction A2 may be referred to as a vertical direction and the right-left in direction A3 is referred to as a lateral direction.

The housing 20 includes a main body 21 and a cover 51. The main body 21 is a metallic member having a thin elongated shape extending along the fitting and pulling in direction A1. A cross-sectional shape of the main body 21 vertical to the fitting and pulling in direction A1 is, for example, a rectangular shape. The main body 21 includes a pair of side surfaces 21a and 21b extending along the fitting and pulling in direction A1, a top surface 21c, and a bottom surface 21d. The main body 21 stores a pair of optical receptacles 211 and 212 to be coupled to an optical connector provided at a distal end of the optical fiber in one end of the fitting and pulling in direction A1. In addition, the main body 21 stores an electrical connector to be connected to an electrical connector provided in an interior of the cage 4 at the other end in the fitting and pulling in direction A1. In the following description, a direction facing one end of the optical transceiver 2 provided with the electrical connector may be referred to as front, and a direction facing one end provided with the optical receptacles 211 and 212 may be referred to as rear. The cover 51 is a plate-shaped member extending along a bottom surface 21d, and covers a part of the bottom surface 21d located immediately below the optical receptacles 211 and 212 (in other words, a part of the bottom surface 21d near the rear end). The cover 51 is, for example, a zinc die-casting product.

The slider 22 is attached to the housing 20 to move relatively along the fitting and pulling in direction A1 with respect to the housing 20. The slider 22 is made mainly of a metal and is provided at a position of the housing 20 near the rear end. The slider 22 surrounds three sides (part of each of the side surfaces 21a and 21b, and the bottom surface 21d illustrated in FIG. 2) in a cross section in a rectangular shape of the main body 21 of the housing 20, and is made by bending a plate-shaped member. A part of the slider 22 above the bottom surface 21d is located between the main body 21 and the cover 51.

The Pull-tab 23 is a substantially U-shaped member coupled to the slider 22. The Pull-tab 23 is made of a member softer than the housing 20 and the slider 22 (for example, a flexible resin). The substantially U-shaped Pull-tab 23 and the slider 22 are coupled and thus a ring is formed. The operator may insert his or her finger into the ring and pull the Pull-tab 23 in the ejected direction (that is, rearward). The Pull-tab 23 only needs to allow the operator to pull in the ejected direction by holding or the like and the shape is not limited to the substantially U-shape. When the Pull-tab 23 is pulled in the ejected direction, a force applied to the Pull-tab 23 transmits to the slider 22, and the slider 22 moves relatively rearward with respect to the housing 20. When the force to pull the Pull-tab 23 is eliminated, the slider 22 moves relatively forward automatically with respect to the housing 20 by an action of an elastic member, which will be described later, and is restored to its original position.

Figure 3:
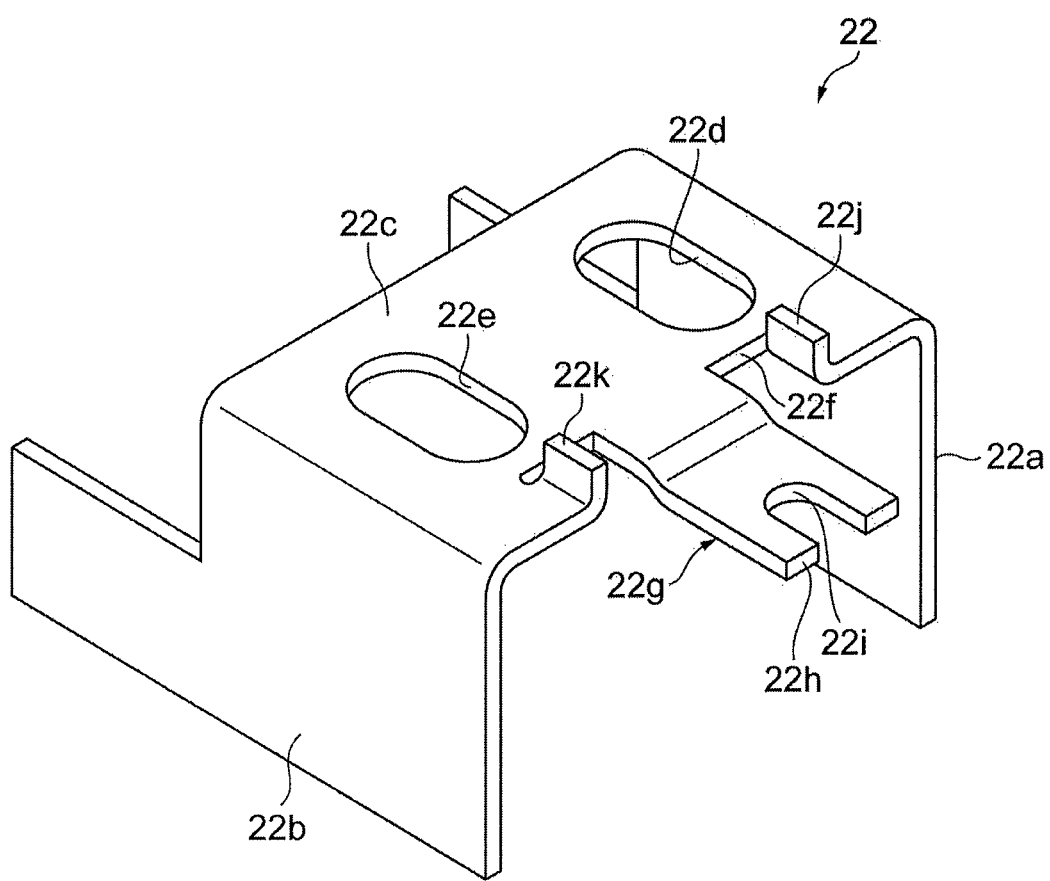
FIG. 3 is a perspective view of a slider viewed obliquely from below.

FIG. 3 is a perspective view of the slider 22 viewed obliquely from below. The slider 22 includes a pair of plates 22a and 22b, and a bottom plate 22c connecting the plates 22a and 22b to each other. The plates 22a and 22b are located above the side surfaces 21a and 21b of the main body 21 of the housing 20, and extend respectively along the side surfaces 21a and 21b. The bottom plate 22c is located above the bottom surface 21d of the main body 21 and extends along the bottom surface 21d. As described above, the bottom plate 22c is disposed between the bottom surface 21d of the main body 21 and the cover 51. The bottom plate 22c is provided with a pair of apertures (holes) 22d and 22e. These apertures 22d and 22e are formed into an elongated circular shape, which has a long axis direction in the fitting and pulling in direction A1. The aperture 22d and the aperture 22e are positioned side by side along the right-left in direction A3 (the lateral direction) and on both sides of a center of the bottom plate 22c in the right-left in direction A3.

The slider 22 further includes a projection 22g projecting forward from the edge 22f of the bottom plate 22c on the insertion side. The projection 22g is a plate-shaped part extending along a virtual plane defined by the fitting and pulling in direction A1 and the right-left in direction A3. A terminal 22h of the projection 22g on the insertion side is provided with a recess 22i formed rearward. A planar shape of the recess 22i viewed in the thickness direction of the projection 22g, that is, the up-down in direction A2 (the vertical direction), is, for example, a U-shape. The slider 22 further includes a pair of projections 22j and 22k projecting outward in the thickness direction of the bottom plate 22c. The projections 22j and 22k are formed by folding part of the bottom plate 22c near the terminal 22h.

Figure 4:
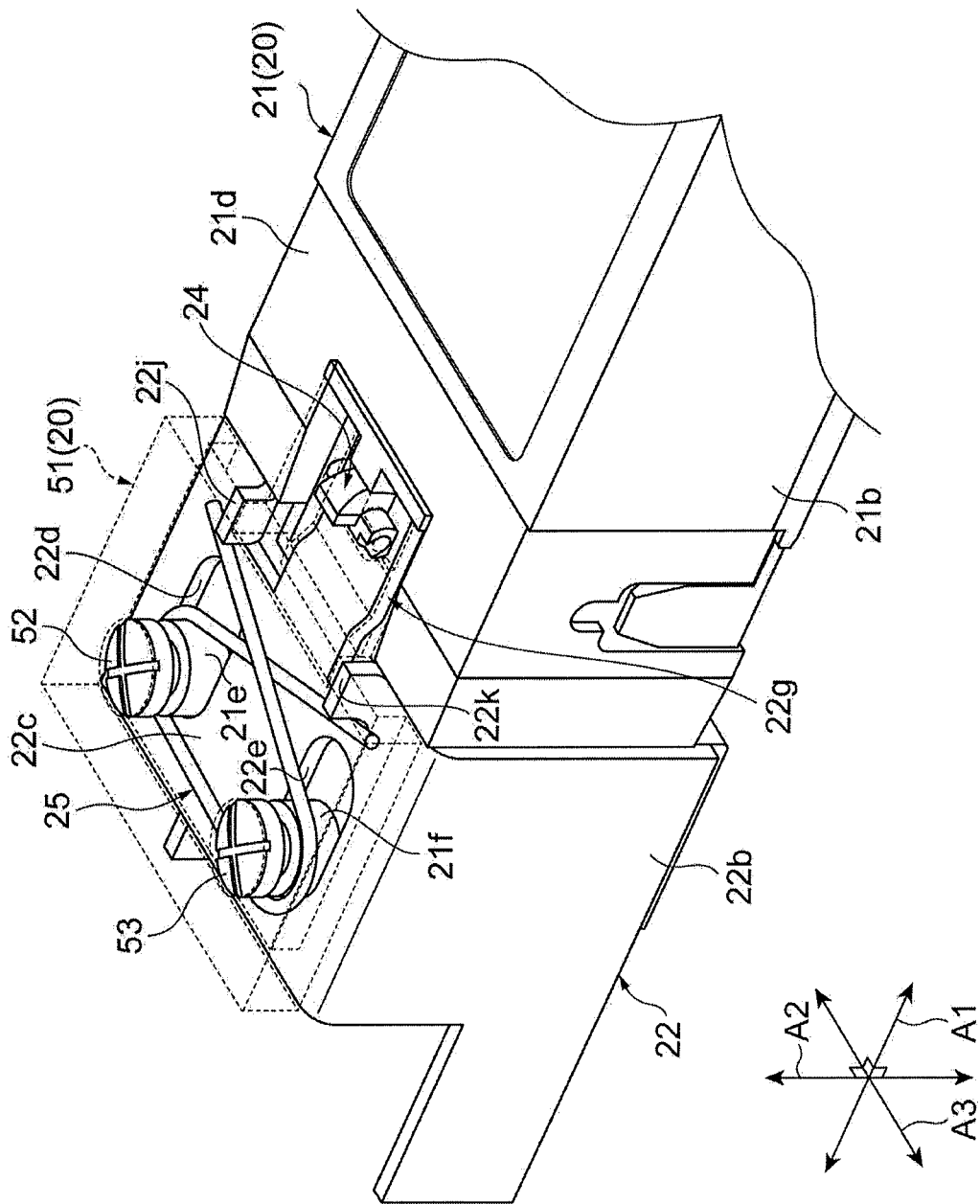
FIG. 4 is a perspective view of a bottom surface of a main body of a housing viewed obliquely from below, and illustrates other components stored between the bottom surface and a cover.
Figure 5:
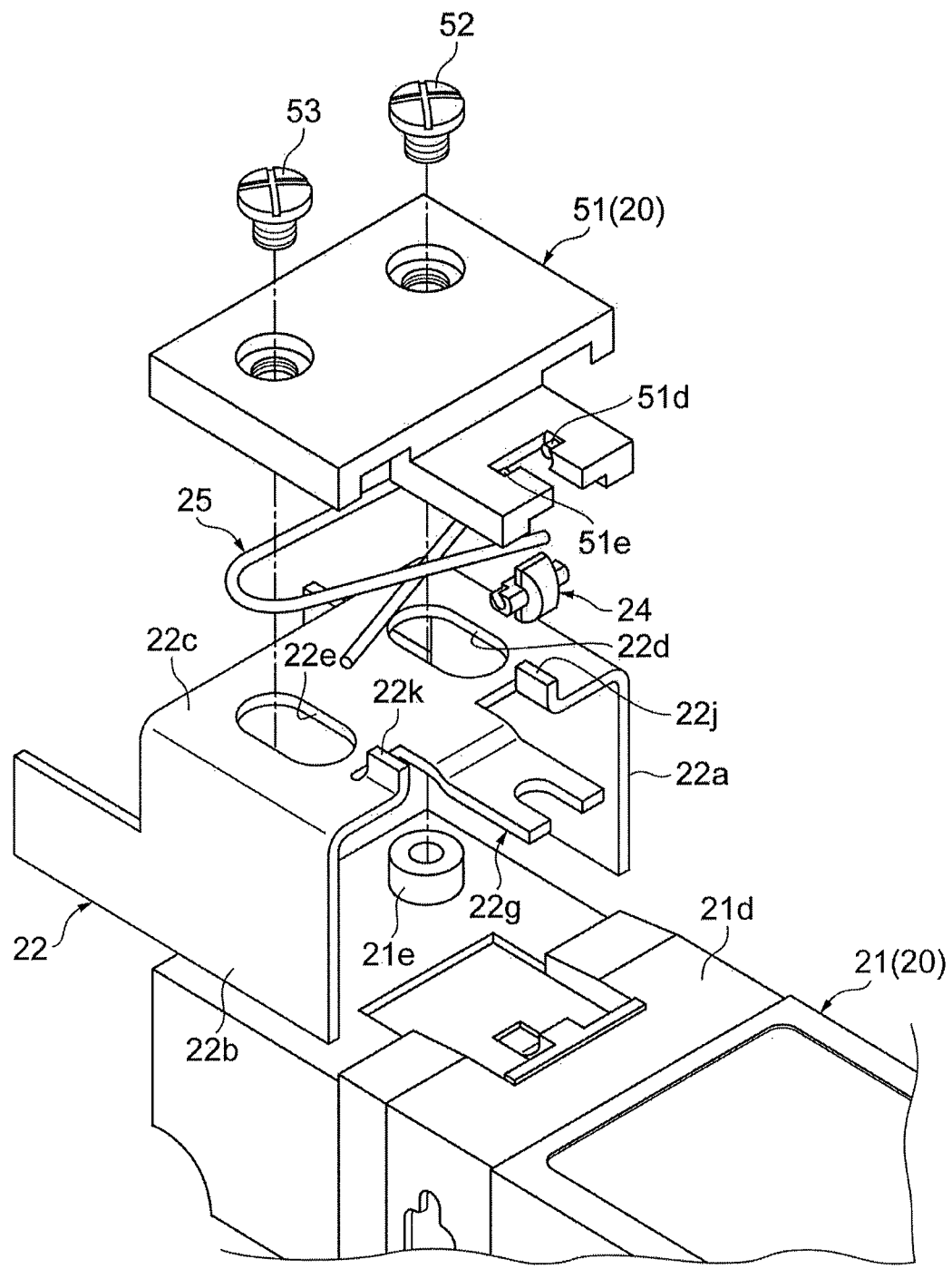
FIG. 5 is an exploded perspective view illustrating a structure on a bottom surface of a main body of the housing.

FIG. 4 is a perspective view of the bottom surface 21d of the main body 21 viewed obliquely from below, and other components stored between the bottom surface 21d and the cover 51 are illustrated. FIG. 5 is an exploded perspective view illustrating a structure on the bottom surface 21d of the main body 21. As illustrated in FIG. 4 and FIG. 5, the cover 51 is fixed to the bottom surface 21d of the main body 21 by screws 52 and 53. Specifically, the bottom surface 21d of the main body 21 is provided with cylindrical shaped projections 21e and 21f, and the screws 52 and 53 engage respectively inner side surfaces of the projections 21e and 21f. The cover 51 is attached to the main body 21 in a state in which the projections 21e and 21f are inserted into the apertures 22d and 22e. As described above, the apertures 22d and 22e have the elongated circular shape having a long axis direction in the fitting and pulling in direction A1, and thus the slider 22 is guided by the apertures 22d and 22e and moves in the fitting and pulling in direction A1 relatively with respect to the cover 51. The apertures 22d and 22e also have a function to limit the range of movement of the slider 22.

Figure 6:
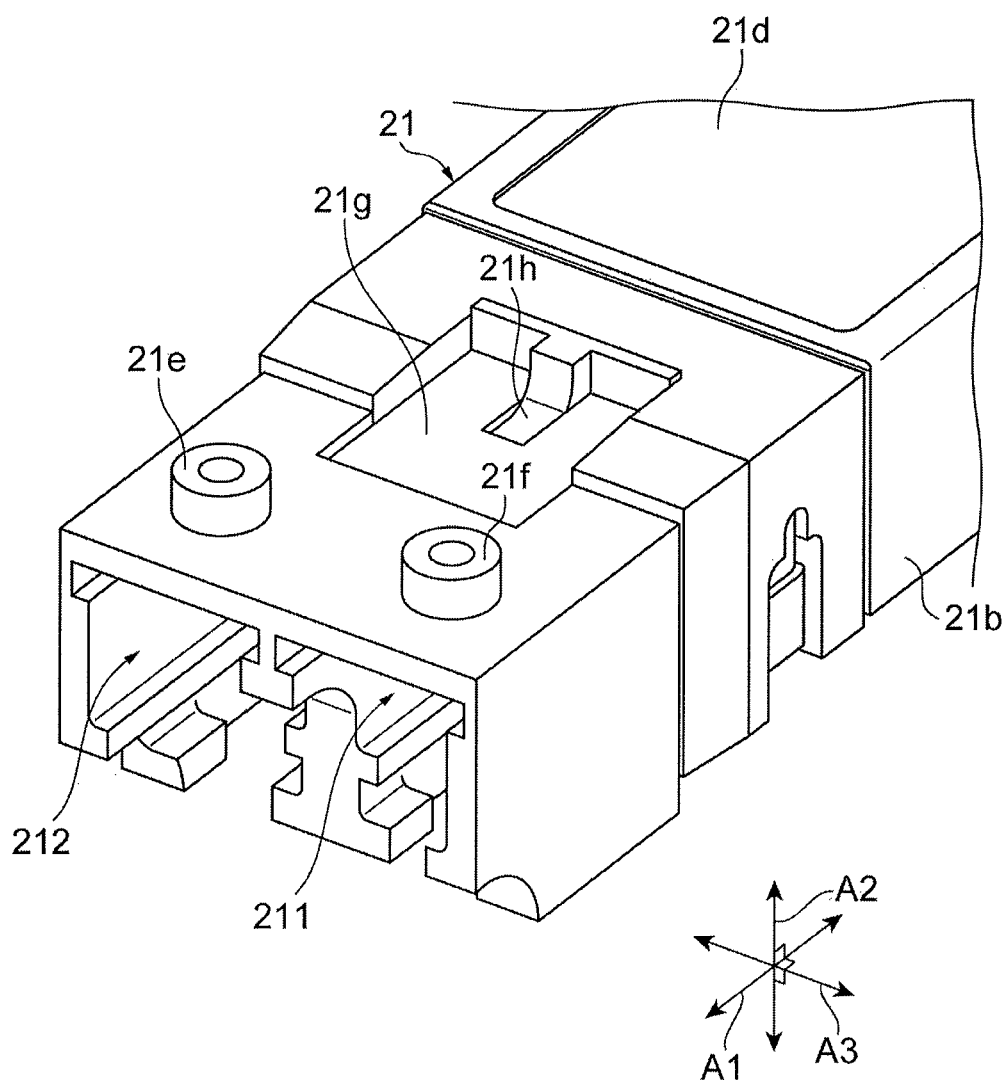
FIG. 6 is a perspective view illustrating a shape of the bottom surface of the main body of the housing.

FIG. 6 is a perspective view illustrating shapes of the bottom surface 21d of the main body 21. The bottom surface 21d is provided with the projections 21e and 21f described above near the rear end portion thereof, and in addition, is provided with a recess 21g. The recess 21g includes a planar shape formed forward of the projections 21e and 21f in the fitting and pulling in direction A1, and has a planar shape in the substantially square shape. The bottom surface of the recess 21g is flat. A curved surface 21h is formed in the recess 21g. The curved surface 21h has a shape like part of the inner surface of a cylinder, and is curved into an arcuate shape depressing toward the main body 21 in a cross section defined by the fitting and pulling in direction A1 and the vertical up-down in direction A2. The curved surface 21h is provided near a front edge of the recess 21g so as to face rearward or obliquely rearward of the fitting and pulling in direction A1.

Figure 7A:
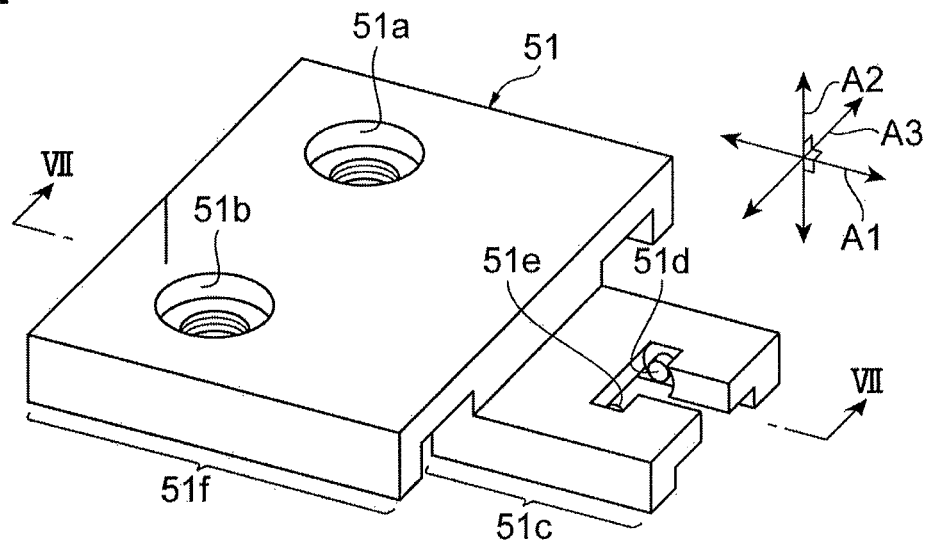
FIG. 7A to FIG. 7C are drawings illustrating a shape of the cover.
Figure 7B:
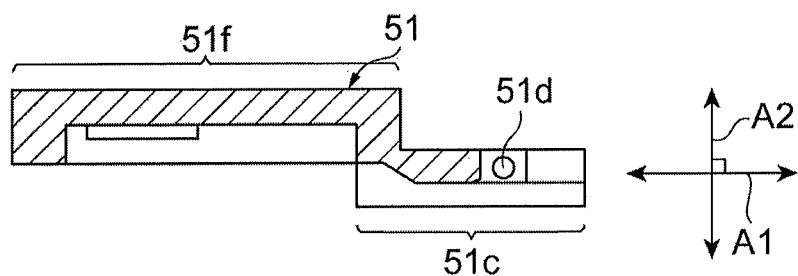
Figure 7C:
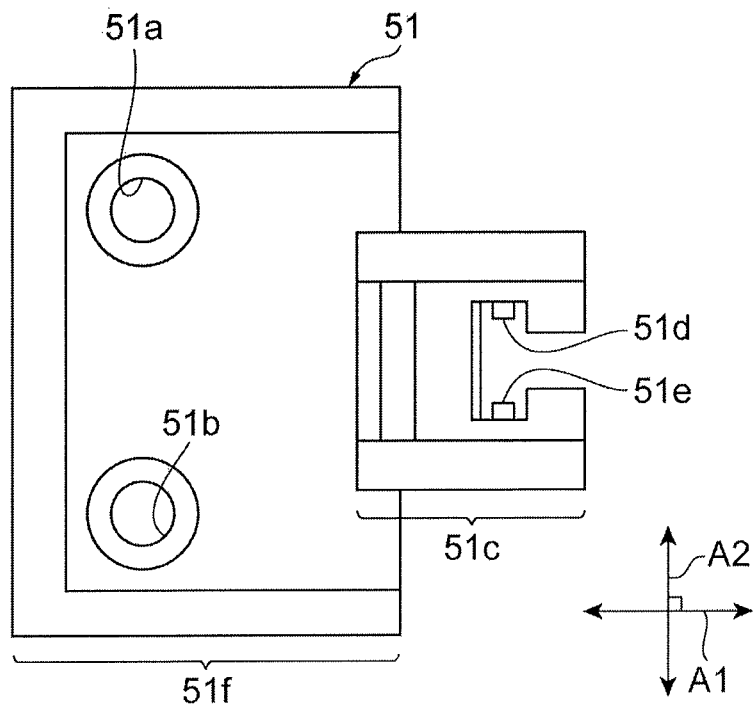

FIG. 7A to FIG. 7C are drawings illustrating the shape of the cover 51. FIG. 7A is a perspective view of the cover 51 viewed obliquely from below. FIG. 7B is a cross-sectional view of the cover 51 extending along a line VII-VII in FIG. 7A. FIG. 7C is a top view of the cover 51. As illustrated in FIG. 7A to FIG. 7C, the cover 51 includes a plate-shaped main 51f having a planar shape of substantially square shape, a pair of holes 51a and 51b formed on the main 51f, a plate shaped projection 51c having a planar shape of a substantially square shape, and a pair of rotary shafts 51d and 51e. The upper surface (the surface facing the main body 21) of the main 51f is depressed, and thus is capable of storing an elastic member 25 (see FIG. 4 and FIG. 5) descried later. The pair of holes 51a and 51b are formed respectively for allowing insertion of screws 52 and 53 illustrated in FIG. 4 and FIG. 5, and are provided at positions respectively facing the projections 21e and 21f of the bottom surface 21d. The projection 51c projects forward from a front edge of the main 51f and projects toward the main body 21 in the direction of the thickness of the cover 51 (the up-down in direction A2). The projection 51c fits the recess 21g of the bottom surface 21d described above, and is restricted by the recess 21g from moving in the right-left in direction A3, and is guided in the fitting and pulling in direction A1. The upper surface (the surface facing the main body 21) of the projection 51c is depressed, and thus is capable of storing a latch 24 (see FIG. 4 and FIG. 5) descried later. The rotary shafts 51d and 51e are cylindrical projections formed near substantially center of the projection 51c. The rotary shafts 51d and 51e project from inner side surfaces of the aperture formed in the projection 51c in a direction facing to each other along the right-left in direction A3. Center axial lines of the cylinders of the rotary shafts 51d and 51e extend along the right-left in direction A3 and match each other. The rotary shaft 51d and 51e having such a shape may be made easily by mold forming.

FIG. 4 and FIG. 5 will be referred again. The optical transceiver 2 further includes the latch 24 and the elastic member 25. The elastic member 25 is provided on the bottom surface 21d of the main body 21 and is disposed between the bottom surface 21d and the cover 51. The elastic member 25 is wound around the projections 21e and 21f projecting from the bottom surface 21d, and is restricted from moving. The elastic member 25 urges the projections 22j and 22k provided on the slider 22 forward. The elastic member 25 has a shape such as a so-called twisted spring (torsion spring).

Figure 8A:
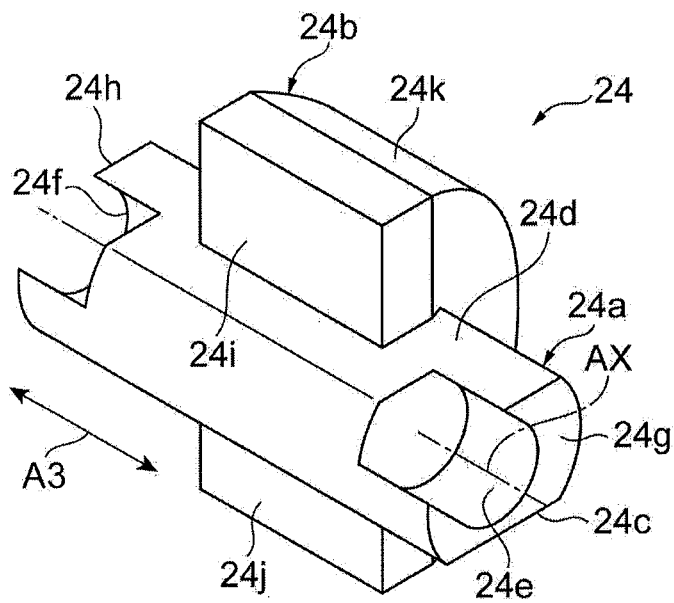
FIG. 8A to FIG. 8C are drawings illustrating appearances of a latch.
Figure 8B:
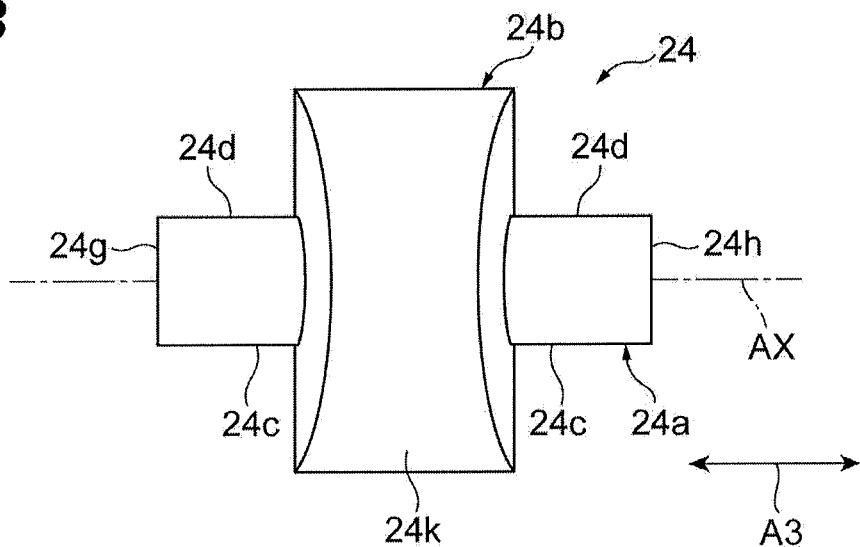
Figure 8C:
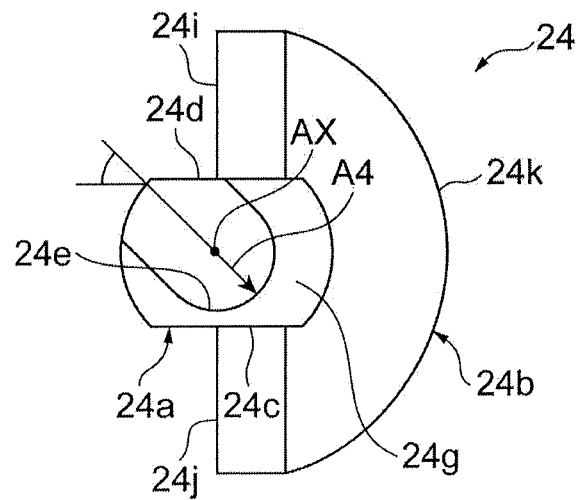

The latch 24 is a latch mechanism on the embodiment, and is provided on the bottom surface 21d of the main body 21, and is disposed between the bottom surface 21d and the cover 51. The latch 24 is supported by the cover 51 in a state of rotatable along the direction intersecting the fitting and pulling in direction A1 about the rotary shafts 51d and 51e extending in the right-left in direction A3. FIG. 8A to FIG. 8C are drawings illustrating appearances of the latch 24. FIG. 8A is a perspective view viewed obliquely above from the latch 24. FIG. 8B is a front view viewed from the front of the latch 24. FIG. 8C is a side view viewing the latch 24 from the side (the right-left in direction A3). As illustrated in FIG. 8A to FIG. 8C, the latch 24 includes a thin and elongated rod shaped shaft 24a, and a main 24b having semi-cylindrical shape.

The shaft 24a extends so that the longitudinal direction extends in the right-left in direction A3, and extends along an trail line of shaft AX along the right-left in direction A3. The shaft 24a has a shape in which a side surface of a round rod extending in the right-left in direction A3 is cutout by a pair of flat surfaces 24c and 24d facing to each other. The pair of flat surfaces 24c and 24d extend parallel to each other and extend in the right-left in direction A3. In addition, the shaft 24a has grooves 24e and 24f at both end portions in the right-left in direction A3. The groove 24e extends to a face of edge 24g of the shaft 24a in the right-left in direction A3, and has an aperture at the face of edge 24g. In the same manner, the groove 24f extends to other surface 24h of the shaft 24a in the right-left in direction A3, and has an aperture at the other end surface 24h thereof. The grooves 24e and 24f respectively extend in the direction of extension of the rotary shafts 51d and 51e of the cover 51, fits respectively the rotary shafts 51d and 51e, and slidably holds the respective rotary shafts 51d and 51e.

As illustrated in FIG. 8C, a deep in direction A4 of the grooves 24e and 24f is inclined with respect to the flat surfaces 24c and 24d. In other words, an angle θ formed between the deep in direction A4 and the flat surfaces 24c and 24d (in other words, an angle formed between the fitting and pulling in direction A1 and the deep in direction A4) ranges from 0° to 90°. It is preferable that the formed angle θ ranges from 30° to 60°. This is because if the formed angle θ is close to 0° or 90°, a wall thickness between the flat surfaces 24c and 24d and the grooves 24e and 24f is reduced, while if the formed angle θ ranges from 30° to 60°, the wall thickness between the flat surfaces 24c and 24d and the grooves 24e and 24f may be increased than the case where the formed angle θ is close to 0° or 90°, and thus the strength is improved. In one example, the formed angle θ is 45°. At least part of the apertures of the grooves 24e and 24f are provided on the flat surface 24d. In this embodiment, part of the apertures of the grooves 24e and 24f are provided on the flat surface 24d, and remaining portion is provided on a cylinder surface between the flat surface 24c and the flat surface 24d. Shapes of the bottom surfaces of the grooves 24e and 24f in a cross section along the fitting and pulling in direction A1 and the vertical up-down in direction A2 are a semicircular shape. A center of the semicircle is the trail line of shaft AX, and corresponds to the rotary shaft (center of rotating) of the latch 24.

The main 24b has a cylindrical shape having the trail line of shaft AX along the right-left in direction A3 as a center axial line cut into half (D cut cam shape). The main 24b includes a face of engagement 24i provided at a position in a first circumference direction around the trail line of shaft AX, and a joint portion 24j provided at a position in second circumference direction around the trail line of shaft AX, and a face of semicircular column 24k. In an example, the face of engagement 24i and the joint portion 24j are flat surfaces flush with each other, and are provided at different circumferential positions 180° apart from each other with respect to the trail line of shaft AX. The face of engagement 24i prevents the optical transceiver 2 from unintentionally slipping out by engaging (latching) part of the cage body 41 when the optical transceiver 2 is inserted into the cage body 41 illustrated in FIG. 1. When the optical transceiver 2 is ejected from the cage body 41, the engaged state is released by the latch 24 rotating around the trail line of shaft AX. The joint portion 24j restricts the rotating range of the latch 24 by coming into abutment with part of the housing 20 when the latch 24 rotates about the trail line of shaft AX. The joint portion 24j comes into abutment, for example, with part of the cover 51.

Figure 9A:
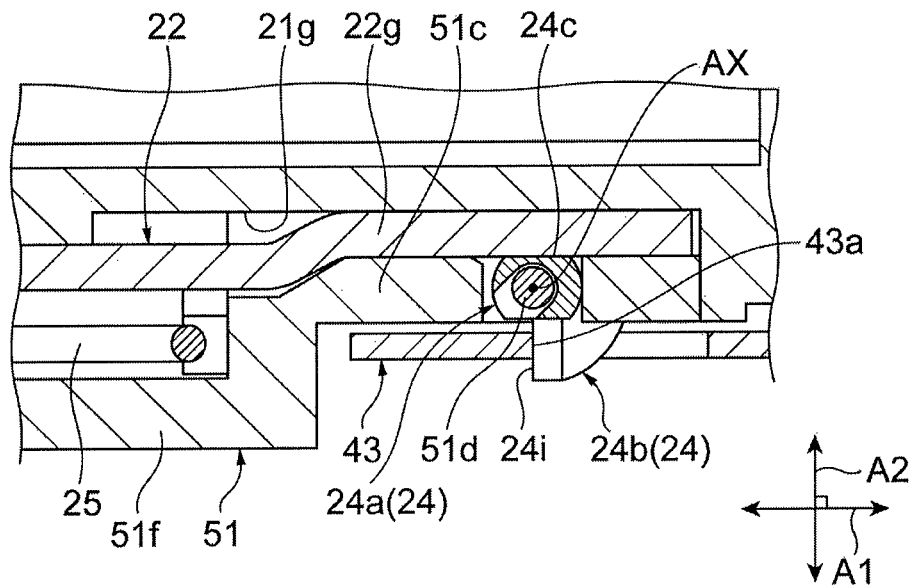
FIG. 9A and FIG. 9B are cross-sectional views illustrating an operation of the latch.
Figure 9B:
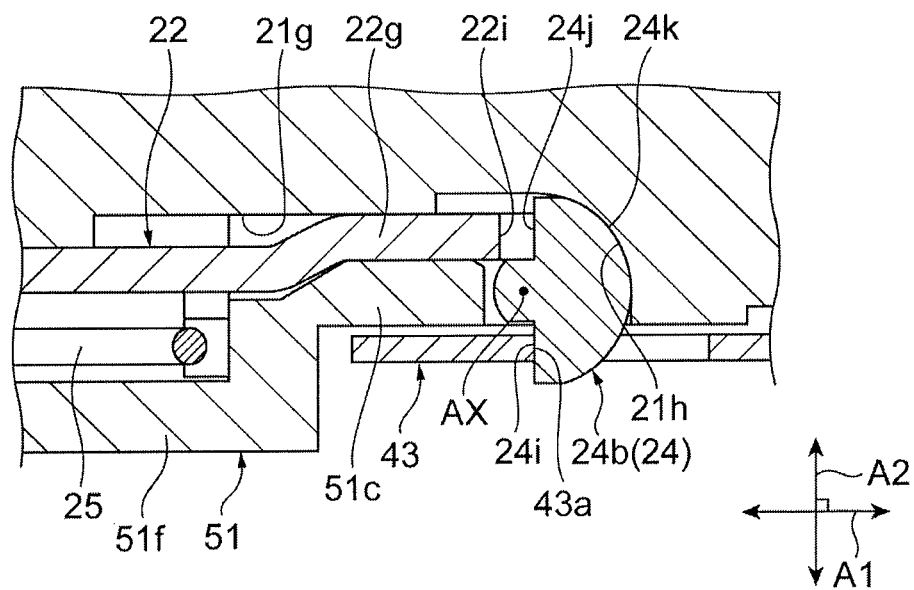
Figure 10A:
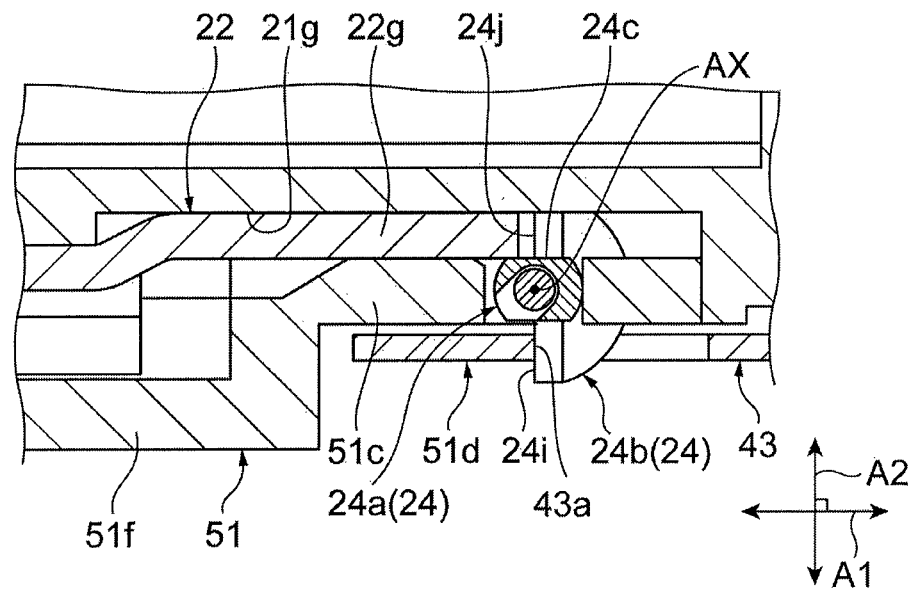
FIG. 10A and FIG. 10B are cross-sectional views illustrating an operation of the latch.
Figure 10B:
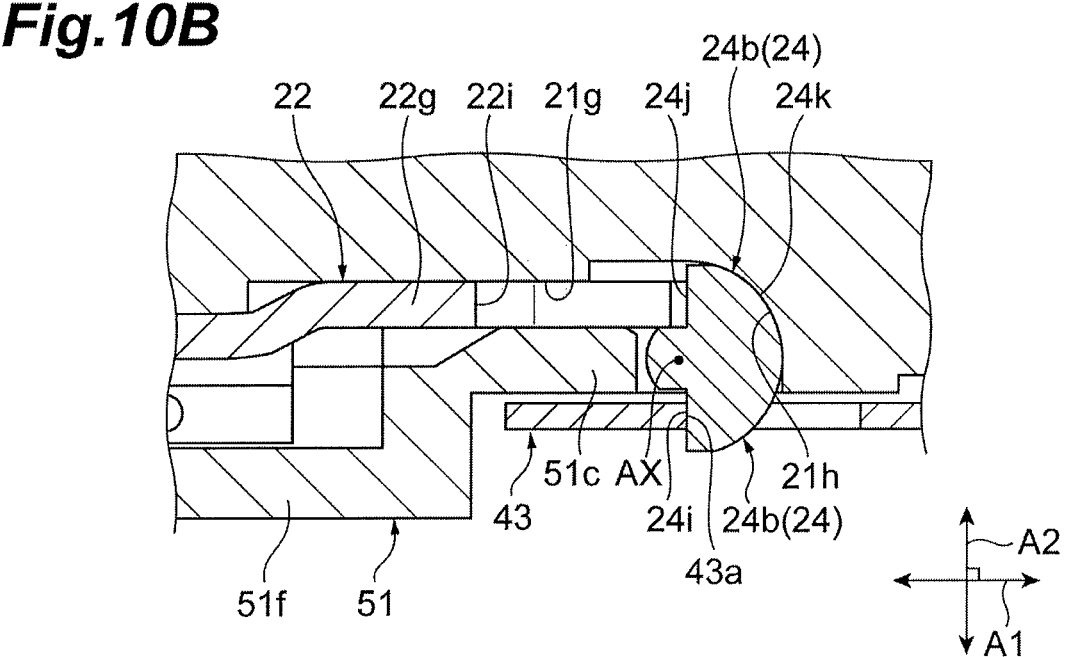
Figure 11A:
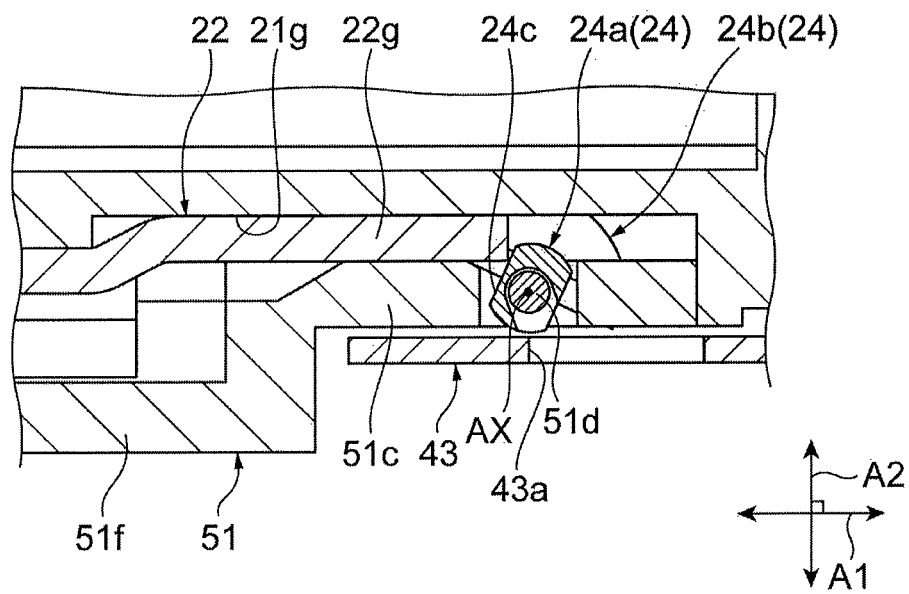
FIG. 11A and FIG. 11B are cross-sectional views illustrating an operation of the latch.
Figure 11B:
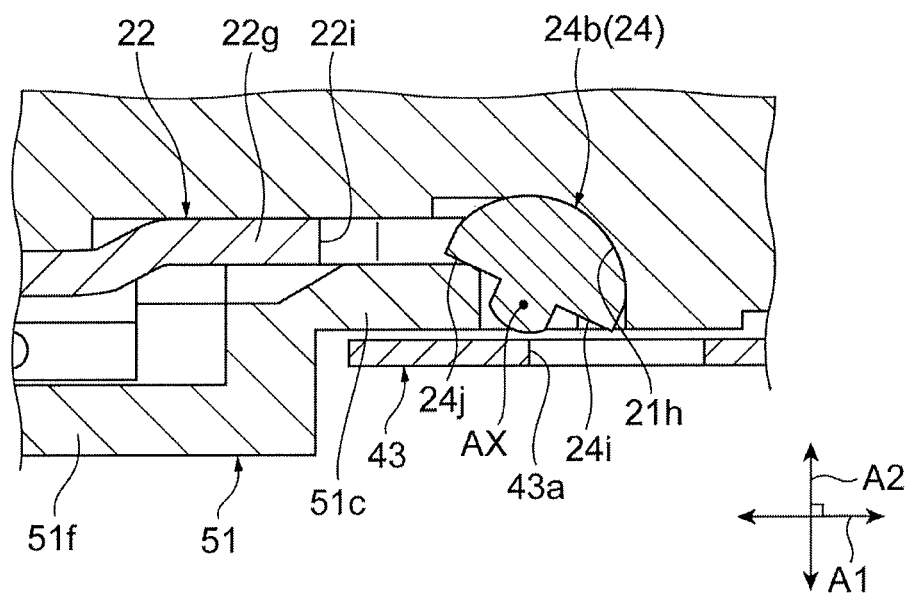

FIG. 9A to FIG. 11B are cross-sectional views illustrating operations of the latch 24. FIG. 9A, FIG. 10A, and FIG. 11A illustrate a cross section passing through the rotary shaft 51d and vertical to the trail line of shaft AX. FIG. 9B, FIG. 10B, and FIG. 11B illustrate a cross section passing through the main 24b and vertical to the trail line of shaft AX. As illustrated in FIG. 9B, the latch 24 is stored the recess 21g formed in the bottom surface 21d, and the face of semicircular column 24k of the main 24b comes slidably into abutment with the curved surface 21h of the recess 21g. Accordingly, the rotating action of the latch 24 is guided by the curved surface 21h and an axial displacement of the latch 24 in the up-down in direction A2 and forward may be prevented.

As illustrated in FIG. 9A, in the normal state, the flat surface 24c of the latch 24 extends along the fitting and pulling in direction A1, and a plate surface of the projection 22g of the slider 22 inserted between the latch 24 and the bottom surface 21d comes into contact with the flat surface 24c of the latch 24, so that the latch 24 is locked. In other words, the flat surface 24c corresponds to the locking surface in the embodiment. Accordingly, the rotating of the latch 24 is controlled. The position of the slider 22 in the fitting and pulling in direction A1 at this time is referred to as a first position. In other words, the first position is a state in which the flat surface 24c, which corresponds to the locking surface, and the lower surface of the slider 22 are in abutment with each other. A relative angle of the latch 24 about the trail line of shaft AX with respect to the housing 20 at this time is referred to as a first relative position angle. In this state, the face of engagement 24i of the latch 24 projects outward of the housing 20. When the optical transceiver 2 is inserted into the cage body 41, a plate-shaped locking part 43, which is part of the latch mechanism provided on the cage body 41, is deflected to bypass the latch 24. As illustrated in FIG. 9A and FIG. 9B, when the face of engagement 24i reaches a hole 43a formed in the locking part 43, the deflection of the locking part 43 is eliminated, and the hole 43a and the face of engagement 24i engage (latch) with respect to each other. In addition, at this time, as illustrated in FIG. 9B, interference between the slider 22 and the joint portion 24j is avoided by the fact that the slider 22 has the recess 22i (see FIG. 3).

When the optical transceiver 2 is ejected from the cage body 41, the Pull-tab 23 illustrated in FIG. 2 is firstly pulled in the ejected direction (that is, rearward in the fitting and pulling in direction A1) by the operator. In conjunction with the Pull-tab 23, the slider 22 moves also in the ejected direction as illustrated in FIG. 10A and FIG. 10B. The position of the slider 22 in the fitting and pulling in direction A1 at this time is referred to as a second position. In other words, the second position is a state in which the flat surface 24c, which corresponds to the locking surface, and the lower surface of the slider 22 are separated from each other. The second position is located on the ejected side (rearward) of the first position. Accordingly, the locked state of the flat surface 24c by the plate surface of the projection 22g is released, whereby the latch 24 is rotatable about the trail line of shaft AX. At this time, the edge portion of the projection 22g may be in contact with part of the flat surface 24c, and if the contact part is rearward of the trail line of shaft AX in the fitting and pulling in direction A1, subsequent rotation of the latch 24 is not obstructed, and the rotation in a reverse direction may be prevented.

When the Pull-tab 23 is pulled continuously in the ejected direction, the housing 20 moves relatively rearward with respect to the cage body 41. Accordingly, since the trail line of shaft AX moves relatively rearward with respect to the locking part 43, the face of engagement 24i is pressed by the inner side of the hole 43a and the latch 24 rotates (see FIG. 11A and FIG. 11B). Accordingly, the engaged (latched) state between the face of engagement 24i and the hole 43a is released, and the optical transceiver 2 is allowed to be ejected from the cage body 41. By the joint portion 24j coming into abutment with the front end of the projection 51c of the cover 51, the rotation of the latch 24 stops. A relative angle of the latch 24 about the trail line of shaft AX with respect to the housing 20 at this time is referred to as a second relative position angle. In other words, the latch 24 is rotatable between the first relative position angle and the second relative position angle described above. Since the elastic member 25 illustrated in FIG. 4 and FIG. 5 urges the slider 22 forward, when a force of pulling the Pull-tab 23 is eliminated, the slider 22 moves automatically forward and restored to its original position (first position). At this time, the front end of the projection 22g of the slider 22 pushes the flat surface 24c, and thus the latch 24 rotates and returns back again to the first relative position angle, and then the projection 22g locks the flat surface 24c again.

Figure 12A:
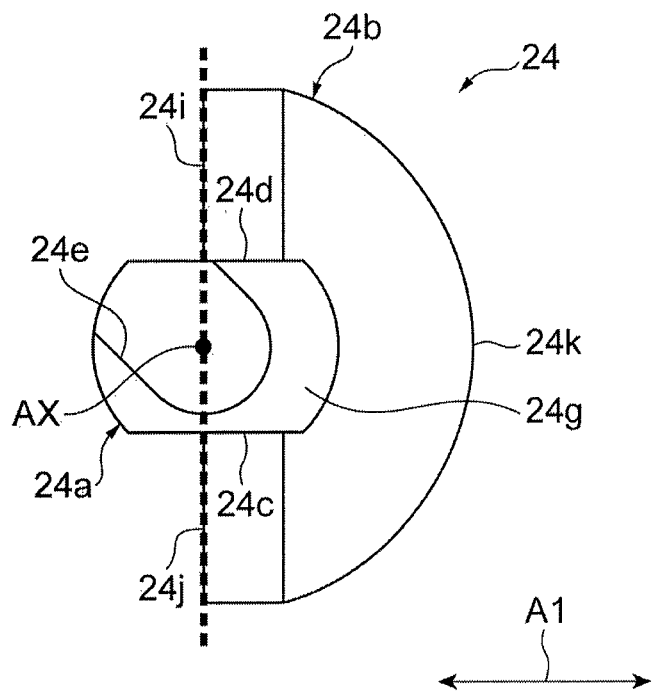
FIG. 12A and FIG. 12B are drawings for explaining a positional relationship between a face of engagement and the trail line of shaft AX in the fitting and pulling in direction A1.
Figure 12B:
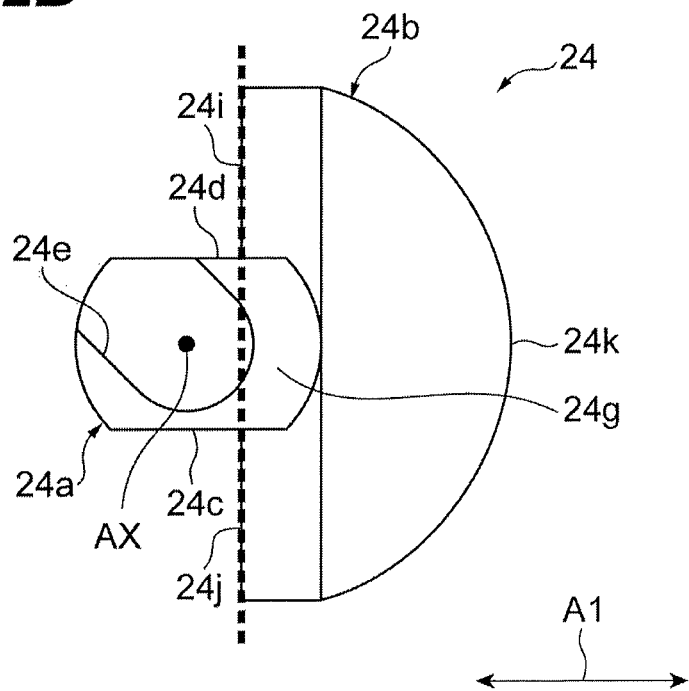

FIG. 12A and FIG. 12B are drawings for explaining a positional relationship between the face of engagement 24i and the trail line of shaft AX in the fitting and pulling in direction A1. The position of the trail line of shaft AX in the fitting and pulling in direction A1 when the flat surface 24c is locked by the slider 22 may be the same as the position of the face of engagement 24i in the same direction as illustrated in FIG. 9A, or may be on the ejected side (that is, rearward) of the position of the face of engagement 24i in the same direction as illustrated in FIG. 9B.

Figure 13:
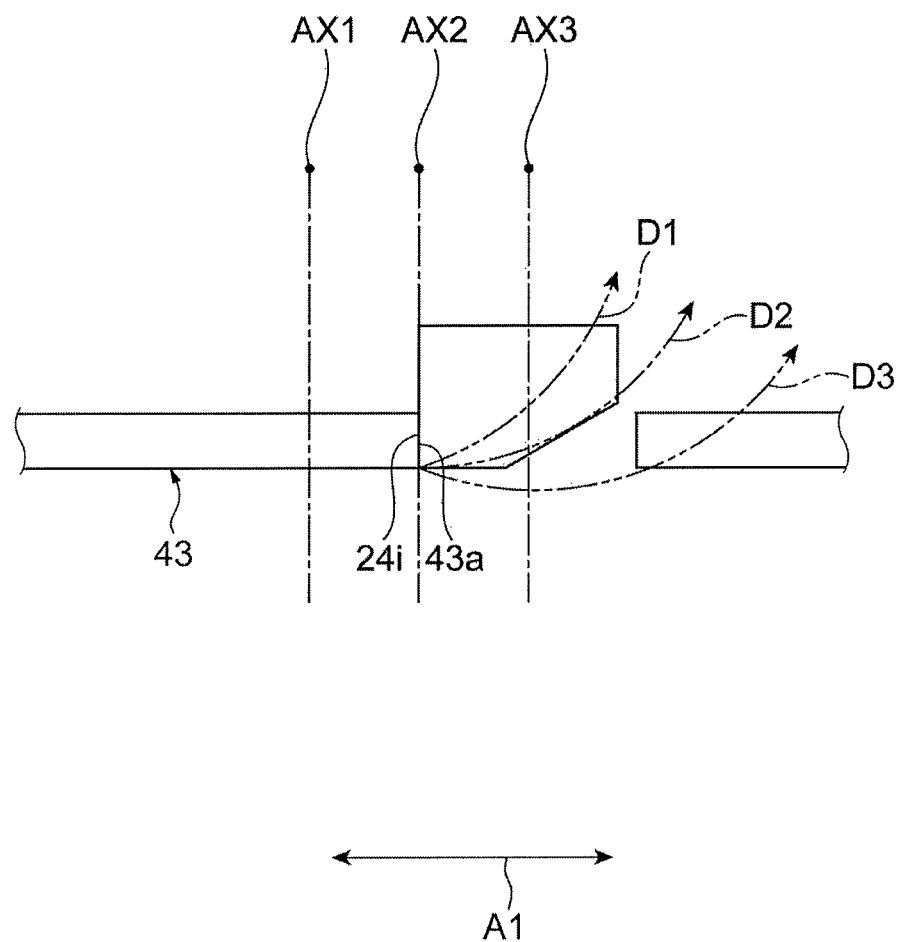
FIG. 13 is a drawing for explaining an effect of a positional relationship between the trail line of shaft AX (center of rotating) and the face of engagement in the fitting and pulling in direction A1 when a flat surface is locked by the slider.
Figure 19A:
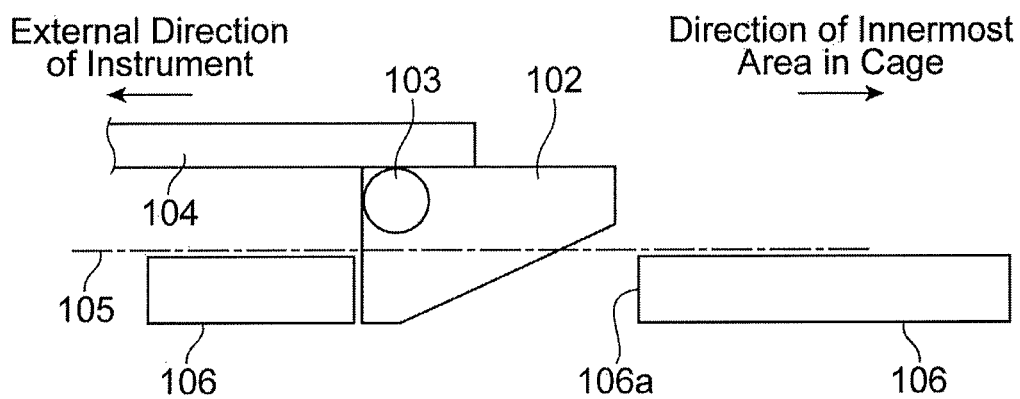
FIG. 19A and FIG. 19B are side views illustrating a conventional package structure.
Figure 19B:
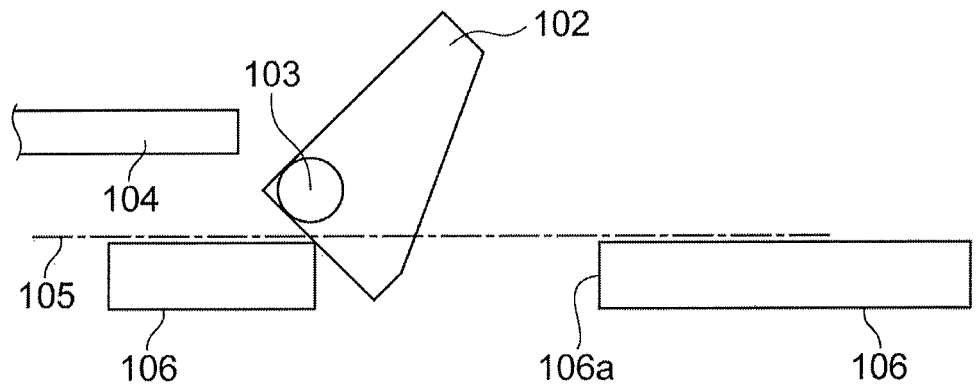

FIG. 13 is a drawing for explaining an effect of the positional relationship between the trail line of shaft AX (center of rotation) and the face of engagement 24i in the fitting and pulling in direction A1 when the flat surface 24c is locked by the slider 22. In FIG. 13, an trail line of shaft AX1 is positioned on the ejected side (rearward) of the face of engagement 24i in the fitting and pulling in direction A1, an trail line of shaft AX2 is at the same position as the face of engagement 24*i* in the fitting and pulling in direction A1, and an trail line of shaft AX3 is on the insertion side (forward) of the face of engagement 24*i* in the fitting and pulling in direction A1. The axial lines AX1 and AX2 correspond to the trail line of shaft AX of the embodiment, and the trail line of shaft AX3 is a center axial line of the rotary shaft 103 of the conventional optical transceiver (see FIG. 19A and FIG. 19B) described above. Also, arcuate shaped arrows D1, D2, and D3 in FIG. 13 correspond to trajectories on an outermost edge of the face of engagement 24*i*. The arrow D1 corresponds to the trail line of shaft AX1, the arrow D2 corresponds to the trail line of shaft AX2, and the arrow D3 corresponds to the trail line of shaft AX3.

Like the trail line of shaft AX3, when the trail line of shaft AX is positioned on the insertion side (forward) of the face of engagement 24*i* in the fitting and pulling in direction A1, the trajectory D3 protrudes outward, and the distance between the outermost edge of the face of engagement 24*i* and the housing 20 is longer in the course of rotation than at the time of engagement (that is, the outermost edge of the face of engagement 24*i* is significantly away from the housing 20 during the rotation than at the time of engagement). In this case, the face of engagement 24*i* interferes with parts of the cage body 41 other than an locking part 43, and thus a smooth operation of the latch mechanism is prevented, and hence it may become difficult to disconnect the optical transceiver 2 from the cage 4.

In contrast, in the optical transceiver 2 of the embodiment, like the trail line of shaft AX1 or AX2, the position of the trail line of shaft AX in the fitting and pulling in direction A1 is the same as the position of the face of engagement 24*i* or on the ejected side with respect to the above-described position. Therefore, the distance between the outermost edge of the face of engagement 24*i* and the housing 20 is the longest at the time of engagement, and is absolutely shorter during the rotating than the length at the time of engagement (that is, outermost edge of the face of engagement 24*i* is significantly away from the housing 20 at the time of engagement than during the rotating). Therefore, according to the optical transceiver 2 of the embodiment, interference of the face of engagement 24*i* of the latch 24 with the part of the cage body 41 other than the locking part 43 is avoided and thus a smooth operation of the latch mechanism is achieved, and the optical transceiver 2 can be easily ejected from the cage body 41.

When the position of the trail line of shaft AX in the fitting and pulling in direction A1 is on the rejected side with respect to the position of the face of engagement 24*i* like the trail line of shaft AX1, the trajectory of toward the housing 20 is larger than the trail line of shaft AX2, and thus a larger space is required on the housing 20. Therefore, it is preferable that the position of the trail line of shaft AX in the fitting and pulling in direction A1 is the same as the position of the face of engagement 24*i*.

As the embodiment, the latch 24 may further includes an joint portion 24*j* provided at a second peripheral position about the trail line of shaft AX and abutting the housing 20, and may rotate between the first relative position angle with respect to the housing 20 when the face of engagement 24*i* engages the locking part 43 of the cage 4, and the second relative position angle with respect to the housing 20 when the joint portion 24*j* abuts against the housing 20. Accordingly, contact between the slider 22 and the flat surface 24*c* when the slider 22 is moved to the first position (see FIG. 9A and FIG. 9B) again may be ensured by limiting the rotating range of the latch 24 when the slider 22 is at the second position (See FIG. 10A to FIG. 11B).

As in the embodiment, the slider 22 may be provided with a recess 22*i* for avoiding the interference with the joint portion 24*j* at the first position (see FIG. 9B) at an end portion on the insertion side. Accordingly, flexibility of layout of the joint portion 24*j* on the latch 24 is enhanced, and for example, the joint portion 24*j* may be disposed, for example, at a circumferential position opposite from the face of engagement 24*i* with respect to the trail line of shaft AX.

As in the embodiment, the flat surface 24*c* of the latch 24 extends along the fitting and pulling in direction A1 at the time of engagement with the slider 22, the housing 20 includes the rotary shafts 51*d* and 51*e*, the latch 24 includes the grooves 24*e* and 24*f* in a direction of extension of the rotary shafts 51*d* and 51*e*, and the rotary shaft 51*d* and 51*e* may be retained in the grooves 24*e* and 24*f*. At least parts of the apertures of the grooves 24*e* and 24*f* are provided in the flat surface 24*d*, and the deep in direction A4 of the grooves 24*e* and 24*f* may be inclined with respect to the flat surface 24*d*. In this structure, attachment of the latch 24 with respect to the housing 20 may be facilitated and an unintentional disconnection of the latch 24 from the housing 20 may be suppressed.

As in the embodiment, the deep in direction A4 of the grooves 24*e* and 24*f* of the latch 24 may be inclined with respect to the flat surface 24*d*. Accordingly, parts partitioning between the grooves 24*e* and 24*f* and the flat surfaces 24*c*, 24*d* may have a large thickness, so that the mechanical strength of the latch 24 may be enhanced.

First Modification

Figure 14A:
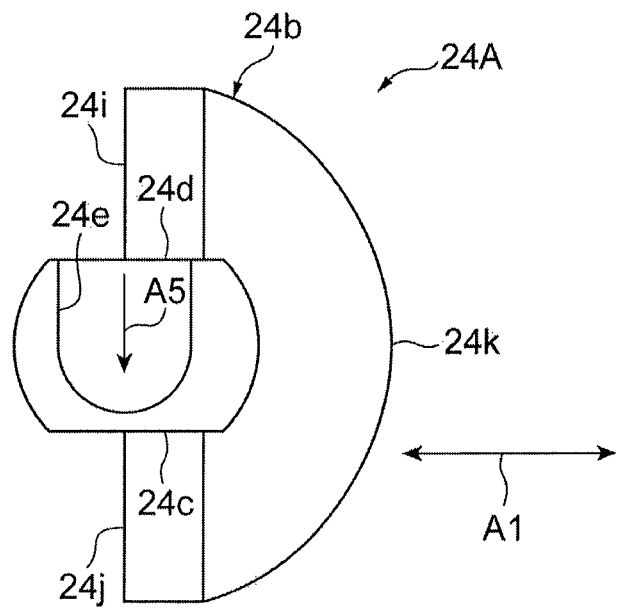
FIG. 14A and FIG. 14B are side views illustrating shapes of latches respectively according to a first modification of the embodiment.
Figure 14B:
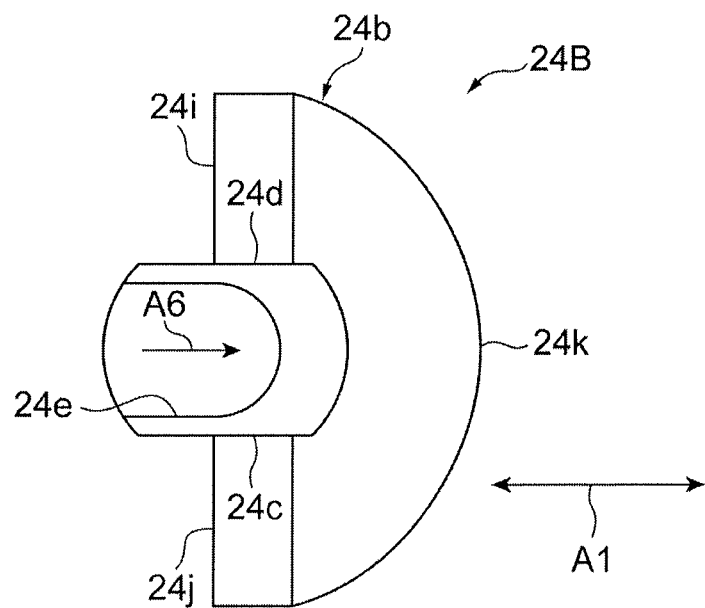

FIG. 14A and FIG. 14B are side views respectively illustrating shapes of latches 24A and 24B according to a first modification of the embodiment described above. A different point between these latches 24A and 24B and the latch 24 in the embodiment described above is the depth direction of the grooves 24*e* and 24*f* retaining the rotary shafts 51*d* and 51*e*. A deep in direction A5 of the grooves 24*e* and 24*f* of the latch 24A illustrated in FIG. 14A is vertical to the flat surfaces 24*d* and parallel to the surface of the face of engagement 24*i*. In other words, when the latch 24A is at the first relative position angle (see FIG. 9A to FIG. 10B), the deep in direction A5 is orthogonal to the fitting and pulling in direction A1. Likewise, a deep in direction A6 of the grooves 24*e* and 24*f* of the latch 24B illustrated in FIG. 14B is parallel to the flat surfaces 24*d* and vertical to the surface of the face of engagement 24*i*. In other words, when the latch 24B is at the first relative position angle (see FIG. 9A to FIG. 10B), the deep in direction A6 is parallel to the fitting and pulling in direction A1. The deep in direction of the grooves 24*e* and 24*f* is not limited to the direction A4 in the embodiment described above, and may be the direction A5 or the direction A6 of this modification, for example.

Second Modification

Figure 15:
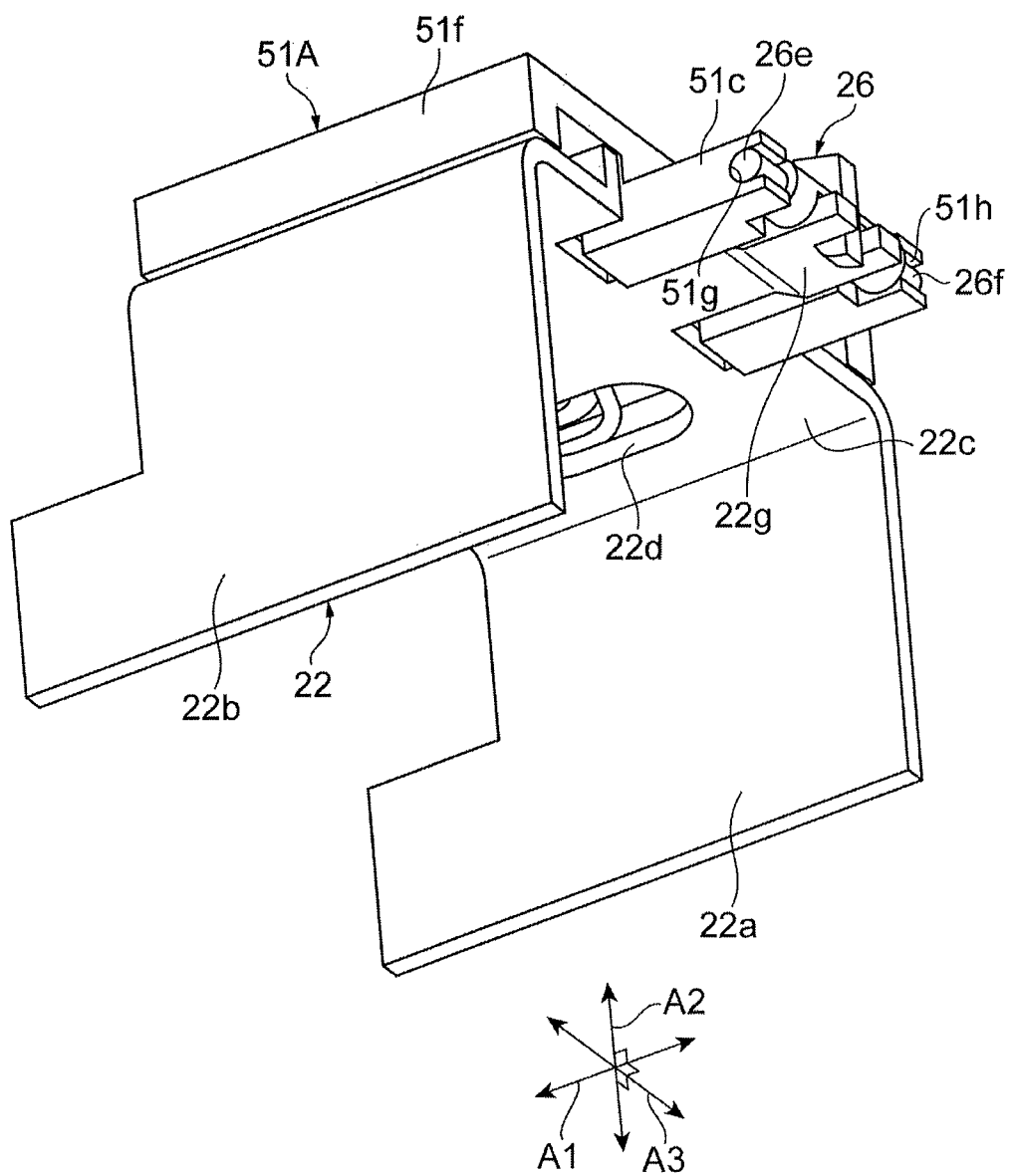
FIG. 15 is a perspective view illustrating a latch and a peripheral structure thereof according to a second modification of the embodiment.
Figure 16A:
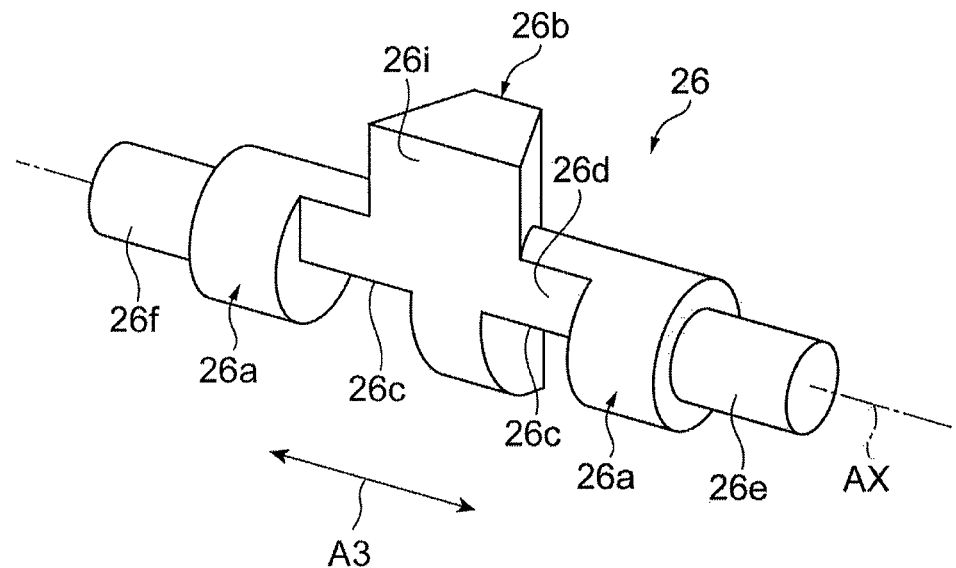
FIG. 16A and FIG. 16B are perspective views illustrating appearances of latches according to a second modification.
Figure 16B:
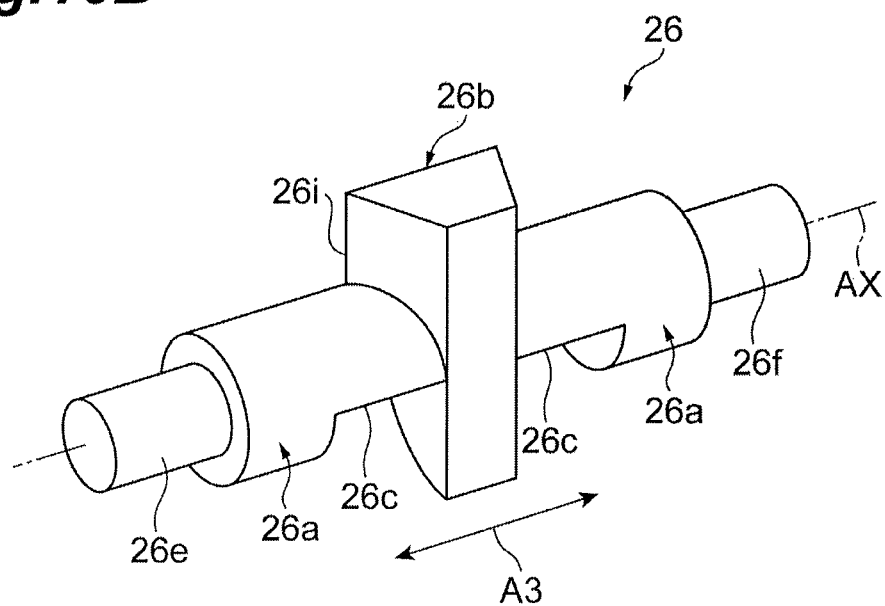

FIG. 15 is a perspective view illustrating a latch 26 and a peripheral structure thereof according to a second modification of the embodiment described above. FIG. 16A and FIG. 16B are perspective view illustrating an appearance of the latch 26, FIG. 16A is a perspective view of the latch 26 viewed obliquely from the rear, and FIG. 16B is a perspective view of the latch 26 viewed obliquely from the front. As illustrated in FIG. 16A and FIG. 16B, the latch 26 of this modification includes a thin and elongated rod shaped shaft 26*a*, and a main 26*b*. The shaft 26*a* extends so that the longitudinal direction extends in the right-left in direction A3, and extends along the trail line of shaft AX along the right-left in direction A3. The shaft 26a has a shape in which a side surface of a round rod extending along the right-left in direction A3 is cutout by a pair of flat surfaces 26c and 26d intersecting each other. The pair of flat surfaces 26c and 26d are vertical to each other and extend in the right-left in direction A3. In addition, the shaft 26a has cylindrical rotary shafts 26e and 26f projecting from both end portions in the right-left in direction A3. A center axial line of the rotary shafts 26e and 26f extend along the right-left in direction A3, and match the trail line of shaft AX. In addition, as illustrated in FIG. 15, the projection 51c of the cover 51A is provided with grooves 51g and 51h instead of the rotary shafts 51d and 51e (see FIG. 7A to FIG. 7C). The grooves 51g and 51h extend in the direction of extension of the rotary shafts 26e and 26f respectively, retain the rotary shafts 26e and 26f respectively, and fit the rotary shafts 26e and 26f respectively. Accordingly, the latch 26 is supported so as to be rotatable about the trail line of shaft AX as the center of rotation. The shape of the cover 51A is the same as the cover 51 in the embodiment described above except that the grooves 51g and 51h are provided instead of the rotary shafts 51d and 51e (see FIG. 7A to FIG. 7C).

A main 26b is a part extending in a direction intersecting the trail line of shaft AX, and is provided in a center of the shafts 26a in the right-left in direction A3. The main 26b has a face of engagement 26i provided at a first circumference position around the trail line of shaft AX. In an example, the face of engagement 26i is a flat surface extending along the right-left in direction A3. The face of engagement 26i engages the hole 43a of the locking part 43 (see FIG. 9A to FIG. 11B) when the optical transceiver 2 is inserted into the cage body 41 illustrated in FIG. 1. Also, when the optical transceiver 2 is ejected from the cage body 41, the engaged state is released by the latch 26 rotating around the trail line of shaft AX.

The flat surface 26c is a locking surface in this modification. The flat surface 26c is in contact with the projection 22g of the slider 22 and is locked by the projection 22g as illustrated in FIG. 15 when the face of engagement 26i engages the hole 43a of the locking part 43 as illustrated in FIG. 15. Accordingly, the rotating of the latch 26 is controlled. When the optical transceiver 2 is ejected from the cage body 41, the slider 22 moves relatively rearward with respect to the latch 26, and the projection 22g is moved away from the flat surface 26c, so that the locked state is released.

The shape of the latch is not limited to the shape like the latch 24 of the embodiment described above, and for example, may be the shape like the latch 26 of this modification, for example. In this case as well, if the position of the trail line of shaft AX in the fitting and pulling in direction A1 is at the same position as, or rearward of, the face of engagement 26i in the same direction, the same advantageous effects as the embodiment described above will be achieved.

Third Modification

Figure 17A:
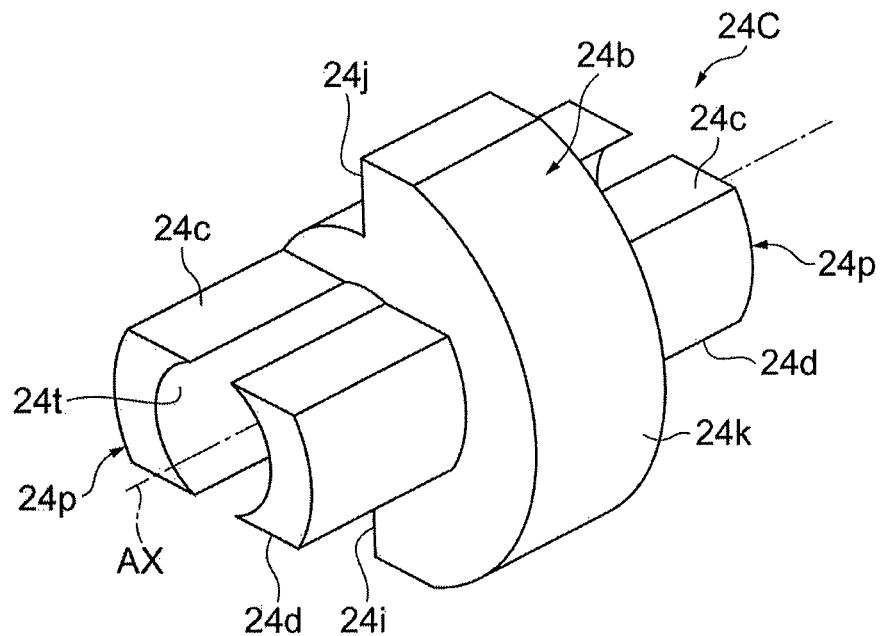
FIG. 17A and FIG. 17B are perspective views illustrating appearances of the latches according to a third modification of the embodiment.
Figure 17B:
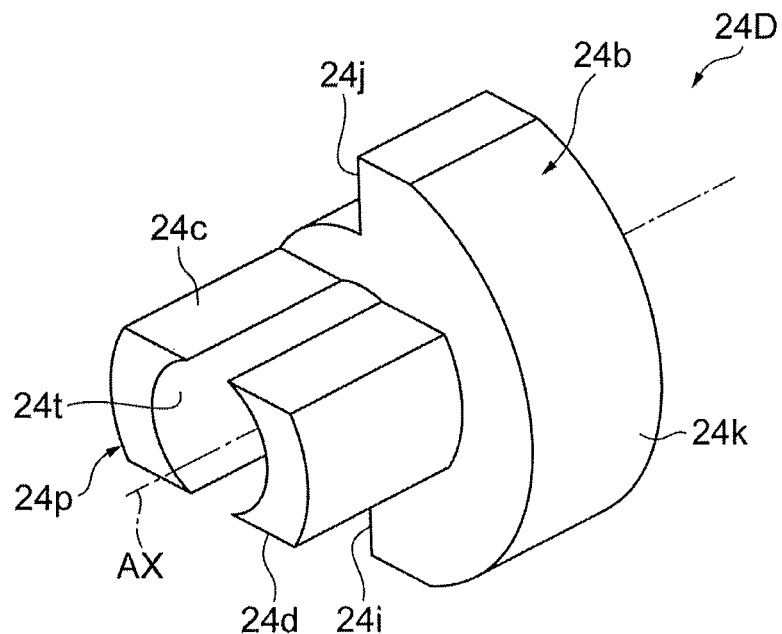

FIG. 17A and FIG. 17B are perspective view illustrating appearances of latches 24C and 24D according to a third modification of the embodiment described above. FIG. 17A and FIG. 17B respectively illustrate the latches 24C and 24D viewed obliquely from the front. The latches 24C and 24D each include the main 24b and a shaft(s) 24p. The main 24b has the semi-cylindrical shape in the same manner as the embodiment described above, and includes the face of engagement 24i, the joint portion 24j and the face of semicircular column 24k. The shaft 24p is provided instead of the shaft 24a of the embodiment described above, and has a longitudinal direction in the right-left in direction A3 and extends along the trail line of shaft AX along the right-left in direction A3. The latch 24C has the shafts 24p on both sides of the main 24b in the right-left in direction A3, and the latch 24D has the shaft 24p only on one side of the main 24b in the right-left in direction A3. The shaft 24p has a shape in which a side surface of a cylinder extending along the right-left in direction A3 is cutout by a pair of flat surfaces 24c and 24d facing to each other. The pair of flat surfaces 24c and 24d extend parallel to each other and extend in the right-left in direction A3. A hole 24t extending along the right-left in direction A3 is provided inside the cylindrical shaft 24p. The hole 24t penetrates through the shaft 24p and the main 24b. A round rod-shaped rotary shaft (not illustrated) having the trail line of shaft AX along the right-left in direction A3 as a centerline is inserted into and fits the hole 24t. The hole 24t slidably retain the rotary shaft. In this modification, the rotary shaft of the cover 51 penetrates through each of the latches 24C and 24D in the right-left in direction A3. For easiness of assembly, the rotary shaft of the cover 51 is supported by the projection 51c in a cantilevered manner. With the shape of the latch 24D, the length of the rotary shaft of the cover 51 may be shortened compared with the shape of the latch 24C, so that the mechanical strength of the rotary shaft may be enhanced. Functions of the face of engagement 24i, the joint portion 24j, and the flat surface 24c are the same as those of the embodiment described above.

The shape of the latch is not limited to the shape such as the latch 24 of the embodiment described above, and for example, may have the shape like the latch 24C or 24D of the modification. In this case as well, if the position of the trail line of shaft AX in the fitting and pulling in direction A1 is at the same position as, or rearward of, the face of engagement 26i in the same direction, the same advantageous effects as the embodiment described above will be achieved.

Fourth Modification

Figure 18A:
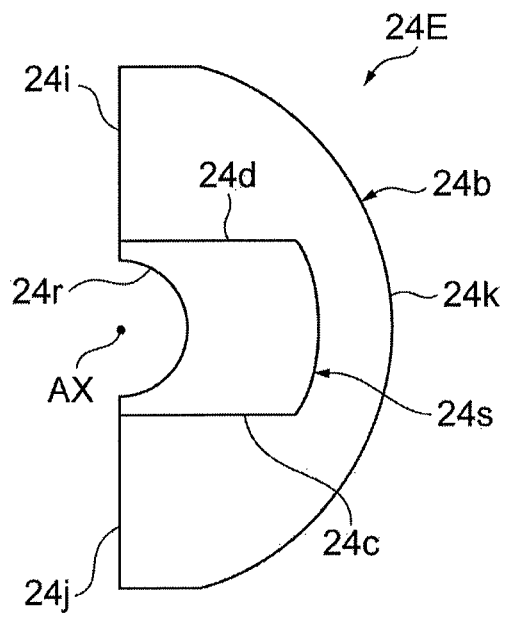
FIG. 18A is a side view illustrating an appearance of a latch according to a fourth modification of the embodiment.

FIG. 18A is a side view illustrating an appearance of a latch 24E according to a fourth modification of the embodiment described above. The latch 24E of the modification includes a main 24b and a shaft 24s. The main 24b has the semi-cylindrical shape in the same manner as the embodiment described above, and includes the face of engagement 24i, the joint portion 24j and the face of semicircular column 24k. The shaft 24s is provided instead of the shaft 24a of the embodiment described above, and has a longitudinal direction in the right-left in direction A3 and extends along the trail line of shaft AX along the right-left in direction A3. The shaft 24s extends along the right-left in direction A3, and includes a pair of flat surfaces 24c and 24d facing each other. The pair of flat surfaces 24c and 24d extend parallel to each other and extend in the right-left in direction A3. Functions of the face of engagement 24i, the joint portion 24j, and the flat surface 24c are the same as those of the embodiment described above. The latch 24E further includes a groove 24r formed in a rear end surface extending from the shaft 24s to the main 24b. The groove 24r extends along the right-left in direction A3, and the shape of a vertical cross section vertical to the direction of extension thereof is a semicircular shape. The center of the semicircular shape matches the trail line of shaft AX.

Figure 18B:
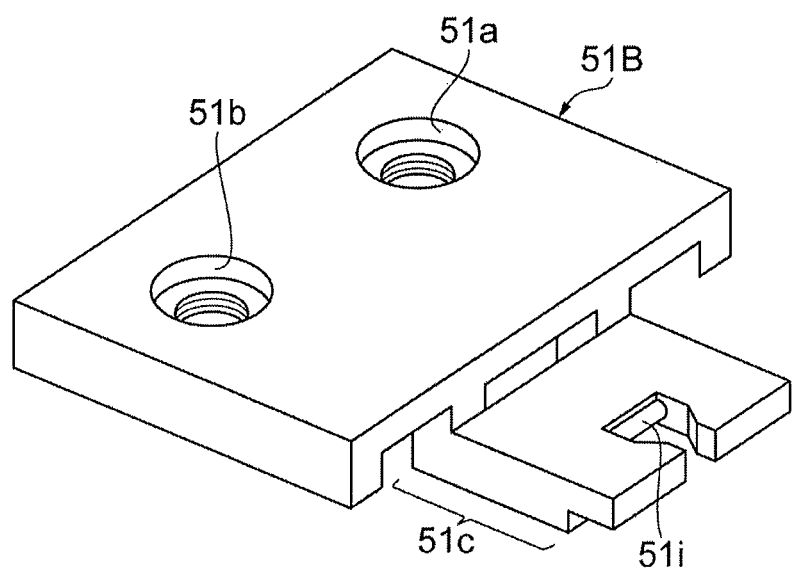
FIG. 18B is a perspective view illustrating an appearance of the cover applied to the present modification.

FIG. 18B is a perspective view illustrating an appearance of a cover 51B applied to the modification. The cover 51B includes a semi-cylindrical portion 51i instead of the rotary shafts 51d and 51e (see FIG. 7A to FIG. 7C) of the embodiment described above. The semi-cylindrical portion 51i extends along the right-left in direction A3, and a center axial line matches the trail line of shaft AX. The semi-cylindrical portion 51i slidably fits the groove 24r of the latch 24E. The rotary shaft does not have to have a curved surface over the entire circumference, and only a minimum curved surface may be formed on the cover 51B as in the modification. In this case as well, if the position of the trail line of shaft AX in the fitting and pulling in direction A1 is at the same position as, or rearward of, the face of engagement 26i in the same direction, the same advantageous effects as the embodiment described above will be achieved.

The optical transceiver according to the present disclosure is not limited to the embodiment or the modifications described above, and other various modifications are possible. For example, in the embodiment described above, although the joint portion 24j is provided on the opposite side from the face of engagement 24i with respect to the trail line of shaft AX, the joint portion 24j needs only to come into abutment with any part of the housing 20 when the latch 24 rotates, and the position of the joint portion 24j in the circumferential direction about the trail line of shaft AX is arbitrary. In addition, although the shape of the face of engagement 24i in the embodiment described above is a flat surface, the shape of the face of engagement 24i is not limited thereto, and various shapes may be applied.

What is claimed is:

1. An optical transceiver which is inserted and ejected with respect to a cage in a first direction, the optical transceiver comprising:
   a slider;
   a housing supporting the slider to slid the slider along the first direction; and
   a latch rotating along a second direction intersecting with the first direction at the center of a shaft, and has a first face engaging the cage, and has a second face locking the slider, the latch being supported by the housing;
   wherein the latch controls the rotating by locking the second face to the slider when the slider is in a first position in the first direction, and uncontrols the rotating when the slider is in a second position farther than the first position ejected a direction in the first direction, and
   wherein a position of the shaft is the same position as a position of the first face or more than a position ejected in the first direction in case of locking the second face to the slider.

2. The optical transceiver of claim 1,
   wherein the latch has a joint portion jointing the housing, and
   wherein the latch rotates either of the first position to the housing when the first face engages the cage and the second position to the housing when the face of the joint portion joints the housing.

3. The optical transceiver of claim 2,
   wherein the slider has a recess part in terminal side inserted to shun intersection in response to the joint portion of the latch in the first position.

4. The optical transceiver of claim 1,
   wherein the first face of the latch extends along the side inserted at engaging the cage by the slider,
   wherein the housing has the shaft, the latch has a groove extending along by a side of the shaft, the groove keeps the shaft, and at least of an aperture in the groove is provided in the first face, and a deep in direction of the groove slopes away in response to the first face.

5. The optical transceiver of claim 1,
   wherein the housing has the shaft, the latch has a hole extending along by a side of the shaft, and the shaft of the housing engages the hole of the latch.

6. The optical transceiver of claim 1,
   wherein the second face of latch touches a bottom face of the slider when the latch is located in the first position, and the second face of latch releases a bottom face of the slider when the latch is located in the second position.

* * * * *

UNITED STATES PATENT AND TRADEMARK OFFICE
CERTIFICATE OF CORRECTION

PATENT NO. : 10,558,004 B2
APPLICATION NO. : 16/277722
DATED : February 11, 2020
INVENTOR(S) : Masato Hino Page 1 of 1

It is certified that error appears in the above-identified patent and that said Letters Patent is hereby corrected as shown below:

On the Title Page

Item (71), Applicant: replace "Yokohama-shi, Kanagawa" with -- Yokohama-shi --.

Signed and Sealed this
Twenty-eighth Day of April, 2020

Andrei Iancu
*Director of the United States Patent and Trademark Office*